US012699547B2

(12) United States Patent
Zhang et al.

(10) Patent No.: US 12,699,547 B2
(45) Date of Patent: Aug. 4, 2026

(54) GENERATING AND VALIDATING BLOCKCHAIN TRANSACTIONS

(71) Applicant: nChain Licensing AG, Zug (CH)

(72) Inventors: Wei Zhang, London (GB); Bassem Ammar, London (GB); Steven Patrick Coughlan, London (GB)

(73) Assignee: nChain Licensing AG, Zug (CH)

( * ) Notice: Subject to any disclaimer, the term of this patent is extended or adjusted under 35 U.S.C. 154(b) by 315 days.

(21) Appl. No.: 18/266,247

(22) PCT Filed: Nov. 15, 2021

(86) PCT No.: PCT/EP2021/081703
§ 371 (c)(1),
(2) Date: Jun. 8, 2023

(87) PCT Pub. No.: WO2022/128285
PCT Pub. Date: Jun. 23, 2022

(65) Prior Publication Data
US 2024/0103815 A1      Mar. 28, 2024

(30) Foreign Application Priority Data

Dec. 15, 2020    (GB) ..................................... 2019748

(51) Int. Cl.
*G06F 8/30* (2018.01)
*H04L 9/00* (2022.01)

(52) U.S. Cl.
CPC ............... *G06F 8/311* (2013.01); *H04L 9/50* (2022.05)

(58) Field of Classification Search
CPC .................................. H04L 9/50; G06F 8/311
See application file for complete search history.

(56) References Cited

U.S. PATENT DOCUMENTS

2003/0009747 A1* 1/2003 Duran ....................... G06F 8/76
                                                                717/137
2011/0314459 A1* 12/2011 Husbands ............... G06F 8/437
                                                                717/151
(Continued)

FOREIGN PATENT DOCUMENTS

CN        109783077 A      5/2019
CN        111033544 A  *  4/2020  ............. G06Q 10/10
(Continued)

OTHER PUBLICATIONS

PCT/EP2021/081703 International Search Report and Written Opinion dated Feb. 9, 2022, 14 pages.
GB2019748.9 Combined Search Report and Abbreviated Examination Report dated Apr. 14, 2021, 6 pages.
Ankush Das et al: "Resource-Aware Session Types for Digital Contracts", arxiv.org, Cornell University Library, 201 Olin Library Cornell University Ithaca, NY 14853, Feb. 16, 2019 (Feb. 16, 2019), XP081537941, the whole document.
(Continued)

*Primary Examiner* — Phillip H Nguyen
(74) *Attorney, Agent, or Firm* — Galvani Smith PLLC

(57) ABSTRACT

A computer-implemented method of generating blockchain transactions, wherein the method is performed by a first party and comprises: generating a first blockchain transaction, wherein the first blockchain transaction comprises a first compact script (CS), wherein the first CS is at least partly written in a high-level (HL) scripting language and comprises one or more HL functions, wherein when executed, each HL function is configured to perform an operation equivalent to a respective operation performed by one or more low-level (LL) functions of a LL scripting language, wherein the first CS is configured to perform an operation equivalent to a first expanded script (ES) written in the LL scripting language and comprising a plurality of LL functions, and wherein the first CS is smaller in storage size than the first ES; and making the first blockchain transaction available to one or more nodes of a blockchain network and/or a second party.

15 Claims, 9 Drawing Sheets

(56) References Cited

U.S. PATENT DOCUMENTS

| | | | | |
|---|---|---|---|---|
| 2020/0394154 A1 * | 12/2020 | Blackshear | ........... | H04L 9/0637 |
| 2021/0035212 A1 | 2/2021 | Chan et al. | | |
| 2021/0318897 A1 | 10/2021 | Wei et al. | | |
| 2021/0319439 A1 * | 10/2021 | Liu | ....................... | H04L 9/0825 |

FOREIGN PATENT DOCUMENTS

| | | | | |
|---|---|---|---|---|
| CN | 112308716 | A | | 2/2021 |
| CN | 110489429 | B | * | 3/2021 |
| GB | 1713046.9 | | * | 9/2017 |
| WO | 2019008532 | A1 | | 1/2019 |
| WO | 2019034959 | | | 2/2019 |
| WO | 2019034959 | A1 | | 2/2019 |
| WO | 2019072310 | A2 | | 4/2019 |
| WO | 2019092545 | | | 5/2019 |
| WO | 2019116184 | A1 | | 6/2019 |
| WO | 2021048661 | | | 3/2021 |
| WO | 2022128285 | A1 | | 6/2022 |

OTHER PUBLICATIONS

The sCrypt Language Reference, Github, accessed Dec. 2020, URL: https://scryptdoc.readthedocs.io/en/latest/index.html.

Annenkov D., et al., "Extracting Functional Programs from Coq, in Coq," Journal of Functional Programming, Aug. 2022, vol. 32, No. e11, 60 pages.

Combined Search and Examination Report for Application No. GB2206120.4, mailed on Sep. 27, 2022, 7 pages.

Combined Search and Examination Report for Application No. GB2206122.0, mailed on Oct. 4, 2022, 8 pages.

International Search Report and Written Opinion for Application No. PCT/EP2023/057915, mailed on Jun. 21, 2023, 16 pages.

International Search Report and Written Opinion for Application No. PCT/EP2023/058874, mailed on Jul. 18, 2023, 14 pages.

JP2023-536523 Office Action dated Dec. 9, 2025, 4 pages.

* cited by examiner

Transaction
from Alice to Bob

Validated by running: Locking
script from output 203 of $Tx_0$,
together with Alice's unlocking
script from input 202 of $Tx_1$. This
checks that Alice's unlocking script
in $Tx_1$ meets the condition(s)
defined in the locking script of
previous transaction $Tx_0$.

700

Transaction Creator
(Sender)

Transaction Receiver
(Validator)

| Generate transaction using HL scripting language |
|---|

$1.\ Tx_{1\text{-}unsigned}$

| Convert between HL and LL scripting languages |
|---|

$4a.\ Tx_1$ $3.\ Tx_{raw}$          $2.\ Tx_{raw\text{-}unsigned}$

| Transaction signing |
|---|

| Generate transaction identifier |
|---|

$4b.\ TxID_1$

| Send transaction and transaction identifier |
|---|

$5.\ Tx_1,\ TxID_1$

| Receive transaction and transaction identifier |
|---|

$8b.\ TxID_1$ $6.\ Tx_1$

| Convert between HL and LL scripting languages |
|---|

$7.\ Tx_{raw}'$

| Generate transaction identifier |
|---|

$8a.\ TxID_1'$

| Compare transaction identifier and candidate transaction identifier |
|---|

GENERATING AND VALIDATING BLOCKCHAIN TRANSACTIONS

CROSS REFERENCE TO RELATED APPLICATIONS

This application is the U.S. National Stage of International Application No. PCT/EP2021/081703 filed on Nov. 15, 2021, which claims the benefit of United Kingdom Patent Application No. 2019748.9, filed on Dec. 15, 2020, the contents of which are incorporated herein by reference in their entireties.

TECHNICAL FIELD

The present disclosure relates to a method of generating blockchain transactions and also to a method of validating blockchain transactions.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

SUMMARY

Blockchains typically use a scripting language for setting a locking condition that locks a particular output of a transaction. Similarly, the corresponding unlocking condition is written in the same scripting language. A scripting language is typically made up of data (e.g. public keys and digital signatures) and functions that operate on the data. This scripting language may be referred to as a low-level scripting language, or a native scripting language. As a particular example, the native scripting language of the Bitcoin blockchain is known as Script. In Script, the functions are known as "opcodes", short for "operation codes".

Transactions containing scripts are transmitted between a generating party (e.g. a user or a machine) to nodes of the network for transaction validation. Depending on the use case, transactions may also be transmitted off-chain, e.g. user-to user, or machine-to-machine. Moreover, transactions are also propagated throughout the blockchain network by the nodes themselves. Furthermore, at least some nodes are required (or at least choose) to store transactions as part of the blockchain.

As the use of blockchain technology continues to increase, there is a need to reduce the bandwidth and storage requirements of transmitting and storing transactions, respectively. This generally applies to all blockchains. Some blockchains place restrictions on the size of transactions, the size of scripts within a transaction, and the size of blocks. In contrast, at least one blockchain (e.g. Bitcoin SV) allows transactions to have an unlimited script size and does not place a limit on block size. This enables the construction of complicated locking scripts (such as smart contracts) which may be of considerable size. This also allows blockchain nodes to construct and publish large blocks, which then need to be stored. Therefore there is an even greater need to save on bandwidth and storage when transmitting and storing transactions as part of this particular blockchain.

According to one aspect disclosed herein, there is provided a computer-implemented method of generating blockchain transactions, wherein the method is performed by a first party and comprises: generating a first blockchain transaction, wherein the first blockchain transaction comprises a first compact script (CS), wherein the first CS is at least partly written in a high-level (HI) scripting language and comprises one or more HL functions, wherein when executed, each HL function is configured to perform an operation equivalent to a respective operation performed by one or more low-level (LL) functions of a LL scripting language, wherein the first CS is configured to perform an operation equivalent to a first expanded script (ES) written in the LL scripting language and comprising a plurality of LL functions, and wherein the first CS is smaller in storage size than the first ES; and making the first blockchain transaction available to one or more nodes of a blockchain network and/or a second party.

According to another aspect disclosed herein, there is provided a computer-implemented method of validating blockchain transactions, wherein the method is performed by a node of a blockchain network, wherein the node is configured to execute script written in a high-level (HI) scripting language, wherein the blockchain comprises a first blockchain transaction, wherein the first blockchain transaction comprises a first output comprising a first compact locking script (CLS), wherein the first CLS is at least partly written in the HL scripting language and comprises one or more HL functions, wherein when executed, each HL function is configured to perform an operation equivalent to a respective operation performed by one or more low-level (LL) functions of a LL scripting language, wherein the first CLS is configured to perform an operation equivalent to a first expanded locking script (ELS) written in the LL scripting language and comprising a plurality of LL functions, and wherein the first CLS is smaller in storage size than the first ELS, and wherein the method is performed by a blockchain node and comprises: obtaining a second blockchain transaction, wherein the second blockchain transaction comprises a first input comprising a first unlocking script; and validating the second blockchain transaction, wherein said validating of the second blockchain transaction comprises: obtaining the first blockchain transaction, and a) replacing the first CLS with the first ELS, and then executing the first unlocking script together with the first ELS, wherein a condition of the second transaction being valid is that said execution is successful, or b) executing the first unlocking script together with the first CLS, wherein a condition of the second transaction being valid is that said execution is successful.

According to another aspect disclosed herein, there is provided a computer-implemented method of validating blockchain transactions, wherein the method is performed by a node of a blockchain network, wherein the node is configured to execute script written in a high-level (HI) scripting language, and wherein the method is performed by a blockchain node and comprises: obtaining a first blockchain transaction, wherein the first blockchain transaction comprises an input referencing an input of a previous blockchain transaction, wherein the first blockchain transaction comprises a first compact script (CS), wherein the first CS is written in the HL scripting language and comprises one or more HL functions, wherein when executed, each HL function is configured to perform an operation equivalent to a respective operation performed by one or more low-level (LL) functions of a LL scripting language, wherein the first CS is configured to perform an operation equivalent to a first expanded script (ES) written in the LL scripting language and comprising a plurality of LL functions, and wherein the first CS is smaller in storage size than the first ES; and as part of validating the second blockchain transaction: obtaining a first candidate transaction identifier; generating a modified version of the first blockchain transaction, wherein this modified version of the first blockchain transaction comprises the first ES instead of the first CS; generating a first transaction identifier, wherein the first transaction identifier is generated based on the modified version of the first blockchain transaction; and comparing the first candidate transaction identifier with the first transaction identifier, wherein a condition of the first blockchain transaction being valid is that the first candidate transaction identifier matches the first transaction identifier.

According to another aspect disclosed herein, there is provided a computer-implemented method of validating blockchain transactions, wherein the method is performed by a node of a blockchain network, wherein the node is configured to execute script written in a high-level (HI) scripting language, wherein the blockchain comprises a first blockchain transaction, wherein the first blockchain transaction comprises a first output, and wherein the method comprises: obtaining a second blockchain transaction, wherein the second blockchain transaction comprises a first input comprising a first compact unlocking script (CUS), wherein the first CUS is at least partly written in the HL scripting language and comprises one or more HL functions, wherein when executed, each HL function is configured to perform an operation equivalent to a respective operation performed by one or more low-level (LL) functions of a LL scripting language, wherein the first CUS is configured to perform an operation equivalent to a first expanded unlocking script (EUS) written in the LL scripting language and comprising a plurality of LL functions, and wherein the first CUS is smaller in storage size than the first EUS; and validating the second blockchain transaction, wherein said validating of the second blockchain transaction comprises:

obtaining the first blockchain transaction, and a) replacing the first CUS with the first EUS, and then executing the first EUS together with the first output, wherein a condition of the second transaction being valid is that said execution is successful, or b) executing the first CUS together with the first output, wherein a condition of the second transaction being valid is that said execution is successful.

Until now, locking scripts and unlocking scripts have been written in the low-level, i.e. native, scripting language. Transactions containing these scripts are then submitted to the blockchain network and, if valid, stored on the blockchain. Now, instead of writing scripts (either locking or unlocking) in the low-level scripting language, scripts can instead be written in a high-level scripting language. Like the low-level language, the high-level language comprises data and functions. However, at least some of these "high-level functions" are configured to perform the same operation as one performed by a plurality of "low-level functions" when executed together. In other words, one high-level function may perform the same operation that would normally require more than one low-level function. This results in scripts that are written in the high-level language being more compact (i.e. reduced size) compared to equivalent locking scripts written in the low-level language.

A script written in the high-level language is referred to as a "compact script" due to the more compact nature of the script compared to a script written in the native low-level language, which is now referred to as an "expanded script". For instance, locking scripts and unlocking scripts written in the high-level language are referred to as "compact locking scripts" and "compact unlocking scripts" respectively.

A complex locking or unlocking condition that would normally require a large expanded script (large in the sense of many low-level functions) may now be written as a smaller compact script using the high-level language. The bandwidth and storage requirements of transactions containing compact scripts are therefore lower than those of transactions containing expanded scripts.

Take the Bitcoin SV blockchain as a particular example. Since there are no limits on block size, a block can contain billions of transactions. With unrestricted transaction sizes, each transaction can contain millions of low-level functions (i.e. opcodes). If each opcode is several bytes in size, each of those transactions would be on the order of several megabytes. This results in both a bandwidth problem when transmitting transaction to the blockchain network and when propagating transactions and blocks on the network. The nodes also face a storage burden when storing the blockchain. A single high-level function may be configured to perform the same operation as millions of low-level functions. Therefore if each transaction was written using the high-level language, the transactions would have a size on the order of several hundreds of bytes, thus providing a significate bandwidth and storage saving. This is also crucial if blockchain technology is to continue to scale.

One can think of native blockchain scripts as an assembly language. E.g. the Script language comprises roughly 100 opcodes. Writing a program in an assembly language is painstaking for developers and the resulting code is often long and hard to comprehend. A high-level language is often used by developers in other technology areas for their compactness and readability. The resulting code is then converted to the assembly language that a computer reads. The present application recognises that the same approach can be used for blockchain scripts by making use of a high-level scripting language. This high-level language may include some or all of the low-level functions of the native scripting language as well as new, high-level functions, or it may be completely independent of such functions and include only the high-level functions.

As explained below, transactions that employ large scripts can now be propagated and stored in a more compact form. Moreover, when executing a blockchain script, nodes can choose the most efficient implementation to run that achieves the same result as the corresponding list of low-level functions, e.g. opcodes. Most importantly, this is achieved without changing the native blockchain protocol.

In some examples, there may be a one-to-one mapping between a single high-level function and a single LL function. In this case the HL function may still be of smaller size than the corresponding LL function, and thus still offering a bandwidth and storage saving.

In some embodiments, the HL language may be an intermediate-level language between an even higher-level language (i.e. a second-tier high level language) and the LL language. This higher-level language is a user-facing language, i.e. a language in which a user writes the script. A user (or other type of party or entity) may generate a script in the user-facing language, and that script is then converted (e.g. compiled) into the intermediate language. The intermediate language is still a high-level language compared to the LL language. The user-facing language may be a human-readable language, making it user friendly and allowing users to more easily write out scripts that are equivalent to complex scripts of the LL language. An analogy can be made between the user-facing, intermediate and low level languages with Java source code (user-facing), Java byte code (intermediate) and machine readable code (low-level). Java source code is compiled into Java byte code, which is then expanded into the machine-readable code. Equivalently, the user-facing language may be compiled into the intermediate-level language, which may then be expanded into the low-level language.

Depending on implementation, the highest-level language (or rather the script written in the highest-level language, which is the user-facing language) may be more compact than the script written in the intermediate-level language. An advantage of introducing the intermediate-level language is the computational saving when expanding to the low-level language. That is, instead of expanding highest-level to low-level directly, blockchain nodes only have to expand to the low-level language from the intermediate-level language. This computational saving further reduces the burden on blockchain nodes.

Whilst embodiments will primarily be described in terms of a locking script being converted from a higher-level language to a lower-level language, in general the same teaching applies to unlocking scripts.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 7 is a flow chart illustrating another example embodiment of the present invention, FIG. 8 schematically illustrates the generation and validation of a transaction according to some embodiments of the present invention, FIG. 9 schematically illustrates an example hierarchy of scripting languages.

DETAILED DESCRIPTION OF EMBODIMENTS

Example System Overview

Figure 1:
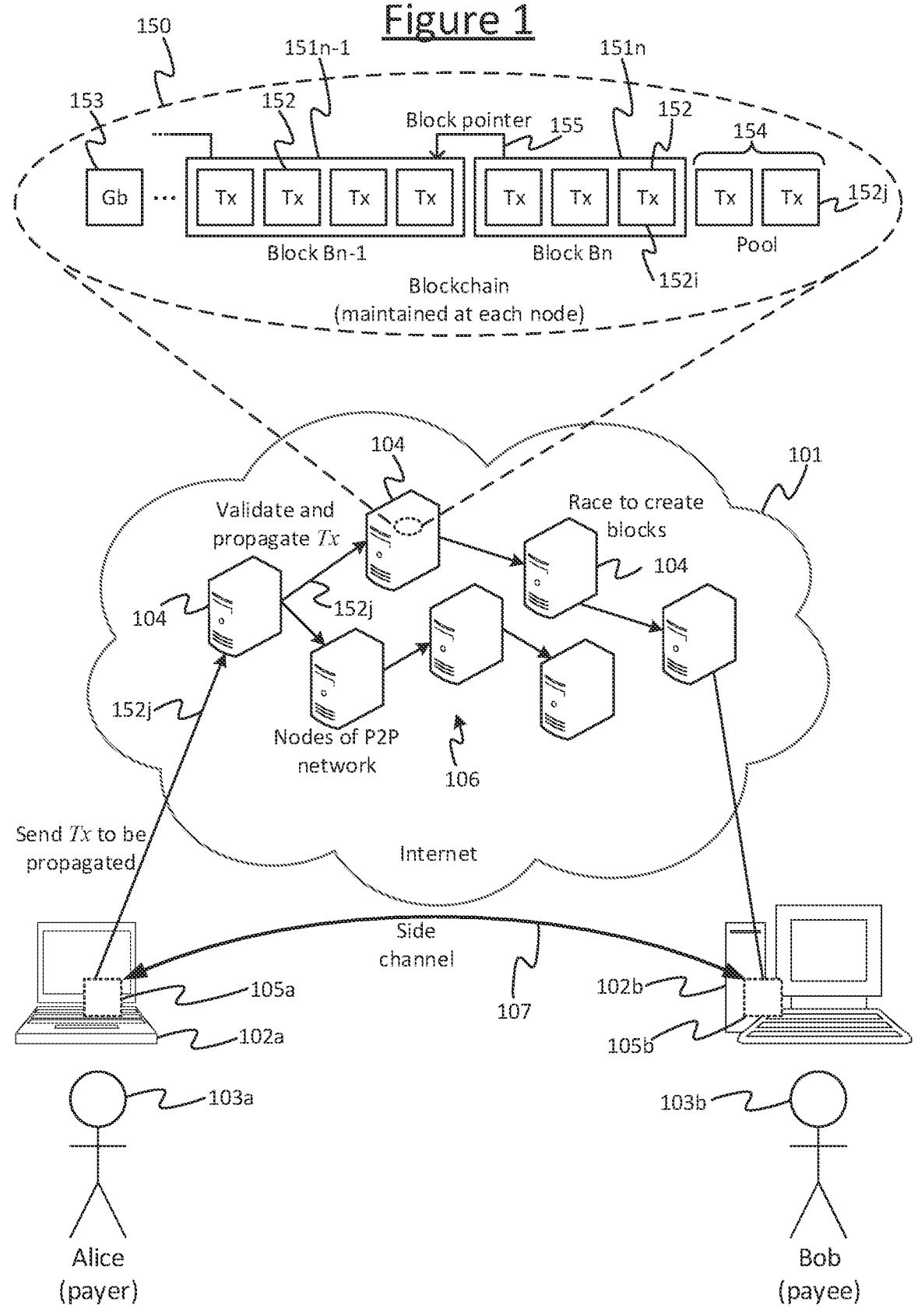
FIG. 1 is a schematic block diagram of a system for implementing a blockchain, FIG. 2 schematically illustrates some examples of transactions which may be recorded in a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the ordered set 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b. The present transaction 152j can thus transfer the amount defined in the input of the preceding transaction 152i to the new user or entity 103b as defined in the output of the present transaction 152j. In some cases a transaction 152 may have multiple outputs to split the input amount between multiple users or entities (one of whom could be the original user or entity 103a in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152j (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
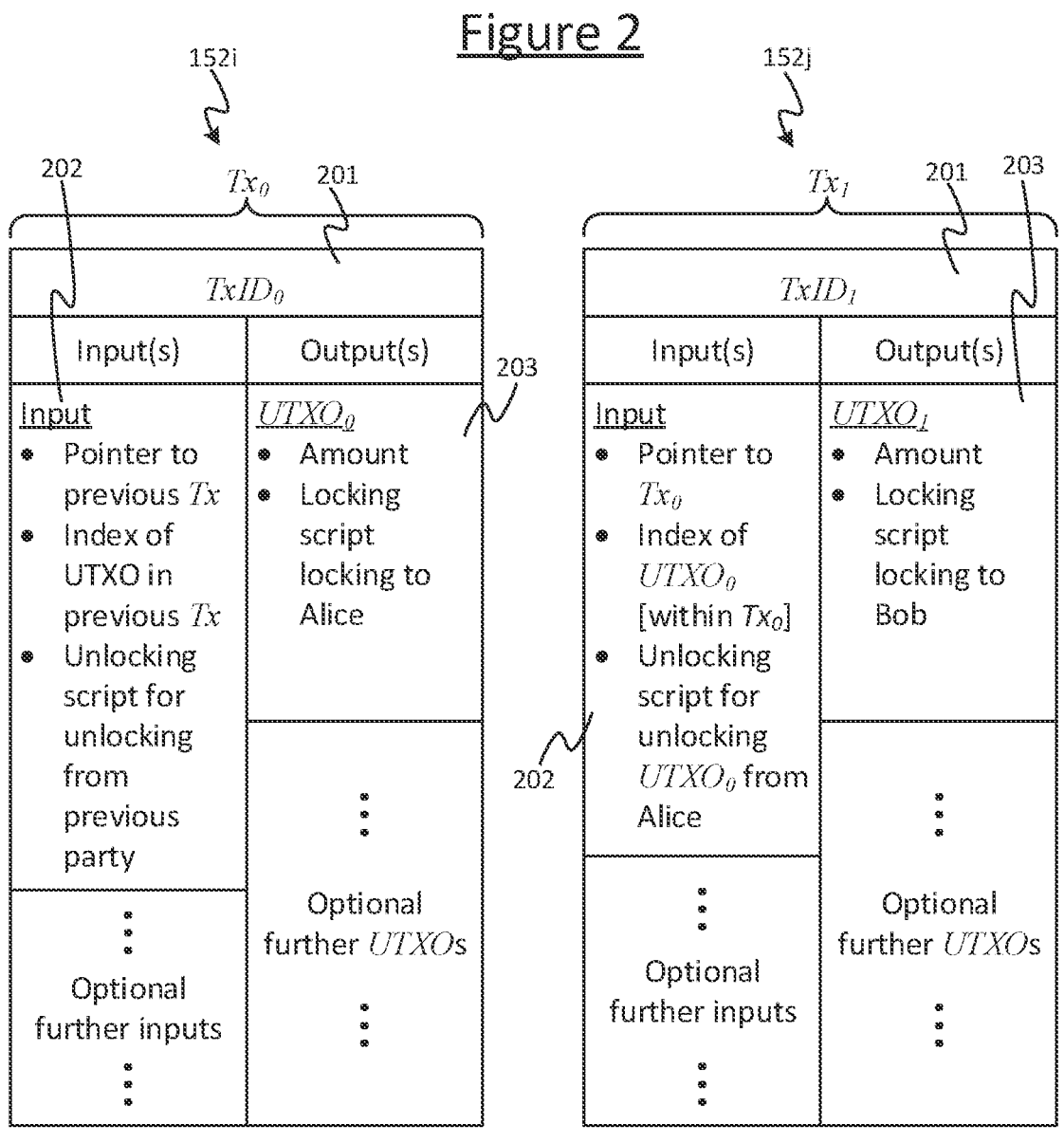

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("x") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "Tx$_1$". It takes an amount of the digital asset that is locked to Alice in the output 203 of a preceding transaction 152*i* in the sequence, and transfers at least some of this to Bob. The preceding transaction 152*i* is labelled "Tx$_0$" in FIG. 2. Tx$_0$ and Tx$_1$ are just arbitrary labels. They do not necessarily mean that Tx$_0$ is the first transaction in the blockchain 151, nor that Tx$_1$ is the immediate next transaction in the pool 154. Tx$_1$ could point back to any preceding (i.e. antecedent) transaction that still has an unspent output 203 locked to Alice.

The preceding transaction Tx$_0$ may already have been validated and included in a block 151 of the blockchain 150 at the time when Alice creates her new transaction Tx$_1$, or at least by the time she sends it to the network 106. It may already have been included in one of the blocks 151 at that time, or it may be still waiting in the ordered set 154 in which case it will soon be included in a new block 151. Alternatively Tx$_0$ and Tx$_1$ could be created and sent to the network 106 together, or $Tx_1$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

Client Software

Figure 3A:
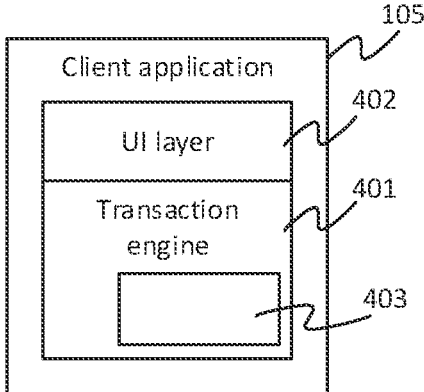
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly. In accordance with embodiments disclosed herein, the transaction engine 401 of each client 105 comprises a function 403 that is configured to write locking scripts in the high-level scripting language and to convert between the high-level scripting language and the low-level scripting language. In other words, a locking script written in the high-level language can be mapped to an equivalent locking script written in the low-level language. E.g. Alice 103*a* may construct a compact locking script using the high-level language, and then the transaction engine 401 may generate a corresponding expanded locking script.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer.

Where reference is made anywhere herein to a single or given application 105, or such like, it will be appreciated that this is just by way of example, and more generally the described functionality could be implemented in any form of software.

Figure 3B:
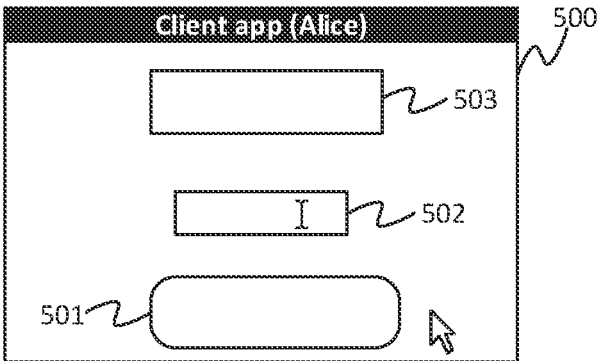
FIG. 3B is a schematic mock-up of an example user interface that may be presented by the client application of FIG. 3A.

FIG. 3B gives a mock-up of an example of the user interface (UI) 500 which may be rendered by the UI layer 402 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to select one or more high-level functions of the high-level scripting language, e.g. a function configured to perform a complex mathematical operation. An option may also allow the user to convert from a compact locking script to an expanded locking script, e.g. to generate a signature based on a version of the transaction containing the expanded locking scripts instead of the compact locking script.

Alternatively or additionally, the UI elements may comprise one or more data entry fields 502, through which the user can write out one or more high-level functions. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

Node Software

Figure 4:
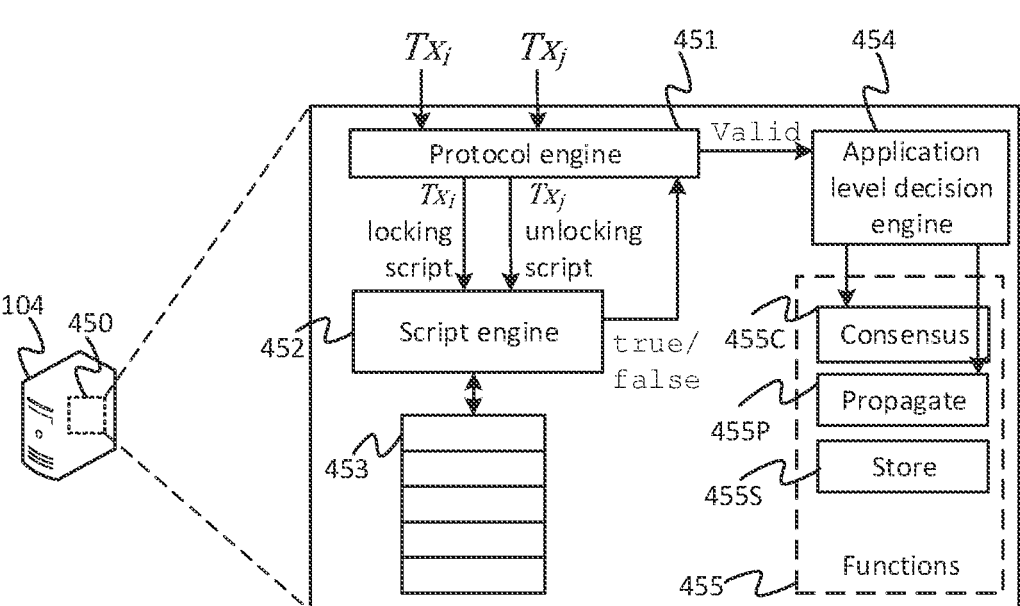
FIG. 4 is a schematic block diagram of some node software for processing transactions.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152*j* ($Tx_j$) is received having an input pointing to an output (e.g. UTXO) of another, preceding transaction 152*i* ($Tx_{m-1}$), then the protocol engine 451 identifies the unlocking script in $Tx_j$ and passes it to the script engine 452. The protocol engine 451 also identifies and retrieves $Tx_1$ based on the pointer in the input of $Tx_j$. $Tx_1$ may be published on the blockchain 150, in which case the protocol engine may retrieve $Tx_1$ from a copy of a block 151 of the blockchain 150 stored at the node 104. Alternatively, $Tx_1$ may yet to have been published on the blockchain 150. In that case, the protocol engine 451 may retrieve $Tx_1$ from the ordered set 154 of unpublished transactions maintained by the node 104. Either way, the script engine 451 identifies the locking script in the referenced output of $Tx_1$ and passes this to the script engine 452.

The script engine 452 thus has the locking script of $Tx_1$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_1$ has not already been spent by another valid transaction. The protocol engine 451 evaluates the result from the script engine 452 together with the one or more protocol-level conditions, and only if they are all true does it validate the transaction $Tx_1$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

High-Level Scripting Language

Figure 5:
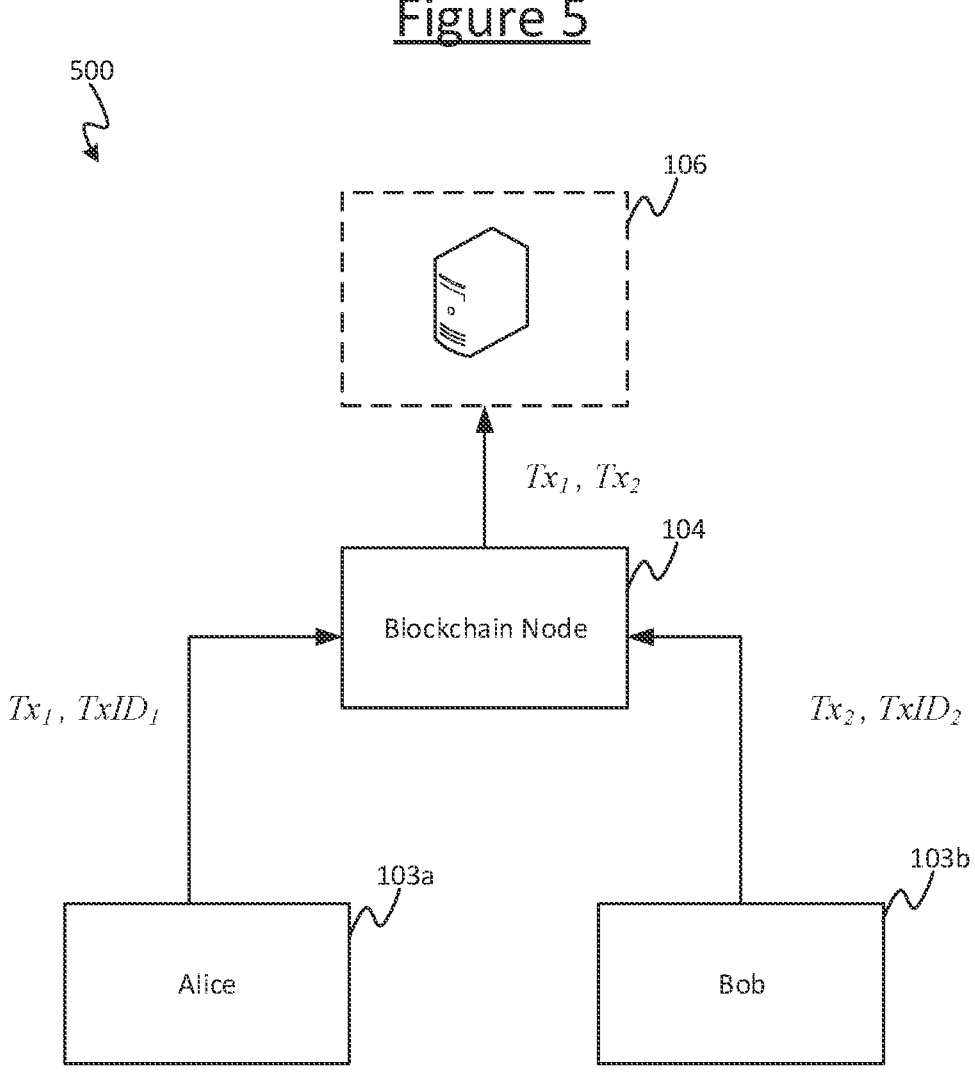
FIG. 5 is a schematic block diagram of an example system for transmitting blockchain transactions.

FIG. 5 illustrates an example system 500 for implementing embodiments of the present invention. The system 500 comprises one or more generating parties (i.e. parties that generate blockchain transactions). For simplicity only two generating parties, Alice 103a and Bob 103b, are shown in FIG. 5. Note that a generating party need not be a user and may instead be a machine. The system 500 also comprises a validating entity, shown in the form of a blockchain node 104, and one or more nodes of a blockchain network 106.

A generating party, e.g. Alice 103a, is configured to generate a first blockchain transaction $Tx_1$. The first blockchain transaction $Tx_1$ comprises one or more outputs. At least one of the outputs (a first output) comprises a compact locking script (CLS). Note that the first output need not appear logically first in the transaction. Instead "first" is used merely as a label for this particular output. The CLS is written in a high-level (HL) scripting language and comprises one or more high-level (HL) functions. Each high-level function is configured to perform an operation equivalent to one or more low-level (LL) functions (e.g. opcode) of the low-level (LL) scripting language of the blockchain 150, i.e. the native scripting language. The CLS is configured to perform an operation (i.e. define a locking condition) that is equivalent to an expanded locking script (ELS) written using only the LL scripting language. For instance, both the CLS and the ELS may define a locking script that finds the modular inverse of a number. Rather than requiring a large number of LL functions to perform that operation, the CLS may comprise a single HL function that is configured to find the modular inverse of the number, thus cutting down on the size of the CLS compared to the ELS. Put another way, a CLS written in the HL scripting language can be compiled into an ELS written in the LL language.

In some examples, there may be a one-to-one mapping between a single high-level function and a single LL function. For instance, a HL function "ADD", or "+" may perform the operation of a corresponding LL function, e.g. OP_ADD. Similarly, the symbols "−", "*" and "/" may be used to perform subtraction, multiplication and division respectively. This offers a saving over LL functions such as OP_SUB, OP_MUL and OP_DIV used by a particular LL scripting language, Script.

In some examples, at least some of the HL functions map to more than one LL function. E.g. a single HL function may perform multiple sequential operations on a data item (see below for examples). In some examples, each HL function maps to more than one LL function.

The first transaction $Tx_1$ may comprise more than one output, e.g. a second output. The second output may also comprise a respective CLS. In general, some or all of the outputs of the first transaction $Tx_1$ may comprise a respective CLS.

Alice 103a is also configured to make the first transaction $Tx_1$ available to the blockchain network 106 in the HL language. For instance, Alice 103a may send the first transaction directly to a blockchain node 104, or indirectly via a different party, e.g. Bob 103b. For instance, Alice 103a may send the transaction $Tx_1$ to Bob 103b over a side channel 107. Upon receiving the transaction, Bob 103b may include a signature that signs over the transaction $Tx_1$. Bob 103b may then send the transaction $Tx_1$ to the network 106. There is a bandwidth saving when transmitting the first transaction since the first CLS is smaller than the corresponding first ELS. Alice 103a may store the first transaction $Tx_1$ in memory of her computing device 102a.

In some examples, Alice 103a may generate a transaction identifier $TxID_1$ for the first transaction $Tx_1$. A transaction identifier is normally a hash or double-hash of the raw transaction data. Alice 103a first generates a modified version of the first transaction $Tx_{raw}$ that does not contain any CLS, but instead contains the corresponding ELS. That is, the first output contains the first ELS in place of the first CLS. Similarly, if the first transaction $Tx_1$ contains multiple CLS, the modified version contains multiple ELS instead. The transaction identifier $TxID_1$ is then generated based on the modified version of the first transaction $Tx_{raw}$, e.g. by taking the hash (e.g. SHA-256) or double-hash (e.g. double SHA-256) of the modified version of the first transaction $Tx_{raw}$. Alice 103a makes the transaction identifier $TxID_1$ available to the blockchain network 106, e.g. by sending to a blockchain node 104 along with the first transaction $Tx_1$.

In some examples, Alice 103a first generates the version of the first transaction $Tx_1$ that contains the CLS, and then generates the modified version of the first transaction $Tx_{raw}$. I.e. by replacing any CLS with the corresponding ELS. In other words the function 403 may convert the first CLS into the first ELS by mapping between HL functions of the HL language and LL functions of the LL language, i.e. the first CLS is compiled into the first ELS. The transaction identifier $TxID_1$ is then generated.

Generating the modified version of the first transaction $Tx_{raw}$ may simply mean replacing the first CLS with the first ELS. The first ELS may then be replaced with the first CLS after the transaction identifier $TxID_1$ has been generated so that the version of the first transaction $Tx_1$ containing the first CLS can be sent to the blockchain network 106.

It is also not excluded that Alice 103a may in the first instance generate the modified version of the first transaction $Tx_{raw}$, i.e. a transaction containing the first ELS. This allows Alice 103a to generate the transaction identifier $TxID_1$. Alice 103a may then replace the ELS with the corresponding CLS. That is, the function 403 may convert the first ELS into the first CLS by mapping between LL functions of the LL language and HL functions of the HL language.

Blockchain transactions often include, in an input of the transaction, a signature for unlocking a referenced output of a previous transaction. If Alice 130a is required to include a signature as part of an input of the first transaction $Tx_1$ for unlocking an output of a previous transaction, Alice 103a may include the signature as part of the modified version of the first transaction $Tx_{raw}$. In other words, Alice's signature signs the modified version of the first transaction $Tx_{raw}$ that contains the first ELS instead of the first CLS. The transaction identifier $TxID_1$ may then be generated based on the modified version that includes Alice's signature. The version of the transaction that is submitted to the network 106 also includes Alice's signature. However the signature will not be a valid signature when validated using the first transaction $Tx_1$ as the message. It is only a valid signature when using the modified version of the first transaction $Tx_{raw}$ as the message.

Note that the replacement of the first CLS with the first ELS may be dependent on the choice of signature flag (e.g. SIGHASH flag) chosen by Alice 103a. For instance, Alice 103a may choose a signature flag (e.g. SIGHASH_NONE) such that the signature does not apply to any of the transaction outputs. In that case, Alice 103a does not have to replace the first CLS with the first ELS. As another example, Alice 103a may choose a signature flag (e.g. SIGHAHS_SINGLE) such that the signature applies to only one output. In that case, if the signature applies to an output that does not contain the first CLS (or any other CLS), then Alice 103a does not need to replace the first CLS with the first ELS (or the corresponding ELS). Moreover, in this case, if a CLS exists in an output other than the one signed by the signature, Alice 103a does not need to replace that CLS. However if the single output signed by the signature does contain the first CLS then Alice 103a must replace the first CLS with the first ELS. Finally, Alice 103a may choose a signature flag (e.g. SIGHASH_ALL) such that the signature signs all of the outputs. In that case, Alice 130a must replace the first CLS with the first ELS. The same applies to any other outputs containing a respective CLS.

In some examples, Alice 103a may generate one or more secondary transaction identifiers. These secondary identifiers are similar to the transaction identifier $TxID_1$ discussed above in that they may be a hash or double-hash of data, but the hashed data is different. For instance, a secondary transaction identifier may be generated based on one or more of a version number of the first transaction $Tx_1$, a locktime of the first transaction $Tx_1$, one or more inputs of the first transaction $Tx_1$ and/or one or more outputs of the first transaction $Tx_1$. As a particular example, the secondary transaction identifier may be based on the version number and locktime. Additionally or alternatively, the secondary transaction identifier may be based on the output(s) that comprise a respective CLS.

An input to a transaction may contain three parts:
1. A transaction identifier concatenated with an index (indicating which transaction output to be spent),
2. An unlocking script, and
3. A sequence number.

The unlocking script may contain digital signatures signing the secondary transaction identifier. Therefore, the part of the unlocking script containing the digital signature that may sign the secondary transaction should be excluded. When the secondary transaction identifier is based on one or more inputs, part or all of the unlocking script of that input may be excluded in order to avoid circular references. In other words, the transaction identifier may be based on only the transaction identifier concatenated with an index, and/or a sequence number, but not a complete unlocking script.

The secondary transaction identifier(s) may be included in an output of the first transaction $Tx_1$, e.g. an unspendable output. The modified version of the first transaction $Tx_{raw}$ may also contain the secondary transaction identifier(s). Therefore in these examples the "primary" transaction identifier $TxID_1$ and the signature are a function of the secondary transaction identifier(s).

In some embodiments, the HL scripting language discussed above, whilst being a higher-level language compared to the LL scripting language, may also be a lower-level language compared to an even higher-level scripting language. That is, the HL language may be an intermediate level language between the LL language and a second-tier HL language. The second-tier HL language is a user-facing language. In other words, the user-facing language may be a scripting language that may be written by a user (or other party or entity, including devices). A script written in the user-facing language can be compiled (which may mean being compressed) into a script written in the intermediate language, e.g. the first CLS. In turn, a script written in the intermediate language may be expanded (e.g. by being mapped) into a script written in the LL language. It is also not excluded that a script written in the user-facing language may be converted directly to a script written in the low-level language.

In other words, in some embodiments there are only two levels of scripting language: the high-level language and the low-level language, whilst in other embodiments there are three levels of scripting language: the user-facing (highest) level, the intermediate language level, and low-level language.

Returning to the examples above, Alice 103a may generate a transaction that comprises a locking script written in the user-facing language, i.e. a user-facing (UF) locking script. Then, before submitting to the network 106, the UF locking script is converted (e.g. compiled) to the first CLS which is written in the intermediate language. The transaction comprising the first CLS may then be submitted to the network 106. In other words, in these examples the user-facing language is only used by Alice 103a when initially generating the transaction.

The transaction is submitted with the locking script in the more compact form of the CLS. The teaching above applies not only to locking scripts, but also to unlocking scripts. That is, in addition to or instead of generating a compact locking script which is converted into an expanded locking script, Alice's transaction may comprise a compact unlocking script. The compact unlocking script may be written in the intermediate language or the user-facing language.

As shown in FIG. 5, a blockchain node 104 obtains the first transaction $Tx_1$. The first transaction $Tx_1$ includes the first CLS (and possibly one or more additional CLSs). The first transaction $Tx_1$ may be obtained directly from Alice 103a, or from a different entity, e.g. Bob 103b. It is also not excluded that the node 104 may obtain the first transaction $Tx_1$ from a different node 104.

The node 104 is configured to validate the first transaction $Tx_1$. In some embodiments, the first transaction $Tx_1$ is validated based on its transaction identifier. In these embodiments, the node 104 obtains a candidate transaction identifier $TxID_1$, e.g. from Alice 103a, Bob 103b or a different entity. It is expected that the transaction generating party, i.e. Alice 103a, will send the candidate transaction identifier $TxID_1$ together with the first transaction $Tx_1$.

The node 104 generates a modified version of the first transaction $Tx_{raw}'$ by replacing the first CLS with a corresponding ELS, i.e. the first CLS is compiled into the first ELS. In other words, the node 104 is configured to convert the first CLS into a first ELS. This may be performed by the node's script engine 452, or by a different function 455. Having generated the modified version of the first transaction $Tx_{raw}'$, the node 104 generates a transaction identifier $TxID_1'$ based on the modified version of the first transaction $Tx_{raw}'$. E.g. the transaction identifier $TxID_1'$ may be generated by hashing or double-hashing the modified version of the first transaction $Tx_{raw}'$.

In order for the first transaction $Tx_1$ to be deemed valid, the obtained candidate transaction identifier $TxID_1$ must match the generated transaction identifier $TxID_1'$. Therefore the node 104 performs a comparison of the transaction identifiers and determines whether they are equal. If the transaction identifiers do not match, the first transaction $Tx_1$ is deemed invalid and may be disregarded.

If the transaction identifiers do match, the node 104 may continue with validating the transaction according to the blockchain protocol. This includes executing the inputs of the first transaction $Tx_1$ together with their respective referenced outputs of previous transactions.

If the transaction $Tx_1$ is valid according to the blockchain protocol, the node 104 may send the transaction $Tx_1$ to other nodes 104 of the network 106 and/or attempt to construct a block based on the modified version of the first transaction $Tx_{raw}$. In other words, the block would include a Merkle root of a Merkle tree having the transaction identifier $TxID_1$ of the modified transaction $Tx_{raw}$ as one of its leaves (i.e. a (double) hash of the modified transaction comprising the first ELS. This may include storing the first transaction $Tx_1$ and/or the modified version of the first transaction $Tx_{raw}$ in memory.

In some examples, the modified version of the transaction may not include the first CLS. In other examples, the modified version of the transaction may include both the first ELS and the first CLS. For instance, the first output of the modified transaction may include the first CLS in a way such that it is not executed during transaction validation. For instance, the first CLS may follow an OP_RETURN opcode: <ELS>OP_RETURN<CLS>. In this case the transaction identifier is based on both the first ELS and the first CLS.

In some examples, the node 104 may send the modified version of the first transaction $Tx_{raw}$ to another node 104 in response to receiving a request. For instance, a block 151 containing the first transaction $Tx_1$ may be published on the blockchain 150. The requesting node 104 may not be configured to validate transactions containing scripts written in the HL language. Therefore the node 104 sends the modified version of the first transaction $Tx_{raw}$ to the requesting node so that the requesting node 104 can validate the first transaction as it would normally for transactions containing only the LL scripting language.

So far the above description of validating transactions has focused on validating transactions containing a CLS but not necessarily an input that is intended to unlock a CLS. For instance, the first transaction $Tx_1$ may include an input that unlocks an output of a previous transaction that is written solely using the LL language.

Assuming the first transaction $Tx_1$ is a valid transaction, it will be published in a block 151. A blockchain node 104 (not necessarily the same node 104 that published that block 151, although that is not excluded) may then receive a second transaction $Tx_2$ that includes an input that references the first output of the first transaction $Tx_1$, i.e. the output containing the first CLS. The second transaction $Tx_2$ may be generated by a second party, e.g. Bob 103b. Bob 103b may send the second transaction directly to the node 104, or indirectly via a different entity, e.g. a third user, Charlie.

The node 104 then proceeds to validate the second transaction $Tx_2$. In order to validate the second transaction $Tx_2$, the node 104 must obtain the first transaction, e.g. from memory or from the blockchain 150. The node 104 then has two options for validating the second transaction $Tx_2$. As a first option, the node 104 may replace the first CLS with the first ELS (i.e. the first CLS is compiled into the first ELS) and then execute the input of the second transaction against the first ELS. The execution must be successful in order for the second transaction to be valid. In other words, the input of the second transaction must successfully unlock the first ELS. As a second option, the node 104 does not need to replace the first CLS with the first ELS and instead the node 104 may execute the input of the second transaction $Tx_2$ against the first CLS. Again, the execution must be successful in order for the second transaction to be valid. In other words, the input of the second transaction $Tx_2$ must successfully unlock the first CLS.

Since the first CLS is equivalent to the first ELS, the same input will unlock both the first CLS and the first ELS. As a simple example, say the first ELS comprise a plurality of LL functions configured to take a number from the input of the second transaction $Tx_2$, perform a mathematical operation on the number, and check whether it matches a number included in the first ELS. The first CLS is configured to perform the same operation but is smaller in size than the first ELS. E.g. the first CLS may include the number and a single HL function, whereas the first ELS may include the number but many LL functions. Since the overall operation of the first ELS and the first CLS is the same, the same input will lead to the same result, i.e. a successful or unsuccessful execution.

If the second transaction $Tx_2$ is valid, i.e. if the unlocking script of the second transaction successfully unlocks the first ELS or the first CLS and any other conditions of the blockchain protocol are met, then the node 104 may send the second transaction $Tx_2$ to other nodes 104 of the blockchain network 106. The node 104 may also store the second transaction $Tx_2$, e.g. in order to construct a block 151 containing the second transaction $Tx_2$.

It may be the case that the second transaction $Tx_2$ comprises one or more outputs containing a respective CLS. In that case, as part of validating the second transaction $Tx_2$, the node 104 may perform the same operations described above when discussing the validation of the first transaction $Tx_1$, i.e. obtaining a candidate transaction identifier $TxID_2$, generating a modified version of the second transaction, generating a transaction identifier $TxID_2'$, and performing a comparison of the obtained and generated transaction identifiers. For efficiency, the comparison may be performed prior to executing the input and output scripts.

The above discussion of transaction validation has primarily focused on validating transactions that comprise a compact locking script. A node 104 may also validate transactions that comprise a compact unlocking script (in addition or instead of a compact locking script). A node 104 may execute the compact unlocking script directly during transaction validation, i.e. the compact unlocking script is executed directly in the HL scripting language (which may be the user-facing or intermediate language). Alternatively, the node 104 may convert the compact unlocking script into an expanded unlocking script written in the LL scripting language before execution.

The description of generating a modified version of a transaction for the purposes of generating a signature and/or a transaction identifier applies equally to the scenario where the transaction comprises a compact unlocking script.

Figure 9:
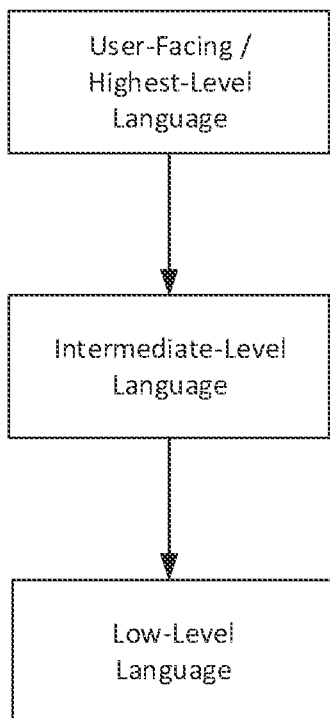

FIG. 9 illustrates the relationship between the three types of language. As shown, at the lowest level is the LL language, i.e. the native scripting language of the blockchain (e.g. opcodes of the Script language). At a higher level is the intermediate language. At a level above the intermediate language is the user-facing language.

This programming architecture is designed to make blockchain scripts more accessible, more computationally and space-wise efficient, and more smart-contract friendly.

The life-cycle of a transaction comprises at least the following stages:

1. Creation—one transaction (the one that is created); script may be in user-facing, intermediate-level, or low level scripting language.
2. Propagation—one transaction (the one that is transmitted); script may be in intermediate-level language for compactness and fast expansion into the LL language at the node's side (compared to user-facing language).
3. Storage—one transaction (the one that is stored); script may be in intermediate-level language for compactness.
4. Validation—two transactions (the one that is spent provides the locking script and the spending transaction provides the unlocking script). There is no validation during creation, propagation, or storage. When executed, a transaction may be executed exclusively in its compact form or in its expanded form, or in a hybrid manner where some but not all of the compact script is converted into native script before execution.

In some examples, a function table may be used by the different parties (i.e. Alice 103a and the nodes 104) when executing compact scripts (locking or unlocking). The function table contains a list of HL functions and the corresponding LL functions. In other words the HL functions are mapped to the corresponding LL functions. The HL functions are compiled (i.e. translated) to the corresponding LL functions and stored in the function table. The function table enables the compact script to be converted to the expanded script and vice versa.

The function table may be created wholly or in part by Alice 103a and distributed to one or more nodes 104, or the function table may be created wholly or in part by another entity, e.g. one of the nodes 104.

In embodiments where a three tier framework is utilised (i.e. user-facing language, intermediate-level language, and low-level language), a function table may be used to map from the UF language to the IL language. When a function is written in the UF language, it is compiled (i.e. translated) into a corresponding IL function. That corresponding IL is mapped to one or more other (i.e. different) IL functions and/or one or more LL functions, i.e. one IL function (e.g. "reverse" in the example section below) is mapped to a set of lower-level functions that together perform an operation equivalent to the IL function. Here, "lower-level" means a level lower than the user-facing level. The set of lower-level functions is stored in the function table in associated with the IL function (in the example section below, "length" is an example of a different IL function).

The function table may then be used to generate and/or execute the IL script. For instance, a reference to or an identifier of the IL function may be included in the IL script so that, when executed, the mapped set of lower-level functions may be executed. In other words, the identifier/reference is used to look up the set of lower-level functions. In this example, the reference or identifier is itself an IL function that is configured, so as when executed, to perform an operation equivalent to one or more LL functions, and equally, to perform an operation equivalent to the identified/referenced function. The IL script can itself be expanded to a corresponding native script. Again, the set of lower-level functions may be obtained from the function table and then expanded to only LL (i.e. native) functions. Note that the set of lower-level functions that define one IL function may itself include a different IL function, or an identifier or reference of that different IL function.

As noted above, there may be multiple different UF languages (e.g. Python and Java) which can be compiled into the same IL language. Preferably the same UF function written in different UF language (i.e. a function configured to perform the same operation but written in different languages) compiles to the same set of lower-level functions of the function table, but this is not essential.

A node 104 may generate a larger function table based on several smaller function tables, e.g. function tables generated by different parties (e.g. users or nodes). An overall table may be stored by a centralized party, and the node 104 may update their table from time-to-time by requesting the overall table.

User-Facing/Highest-Level Language

The user-facing language is human readable, developer friendly, extensible, and can be compiled to the intermediate-level language. An example of a user-facing language is provided below. However, there may be multiple different user-facing languages that can be compiled to the same intermediate-level language. Existing languages, such as Java, JavaScript, or Python, may also be adapted to become a high-level language for creating blockchain transactions.

Intermediate-Level Language

The intermediate-level language connects a higher-level language to the low-level language (e.g. opcodes) to achieve efficiency gain in bandwidth, storage, and computation. In the following, this universal intermediate-level language will be called meta script. The characteristics of meta script can be summarised as:

1. Space efficient—more compact than the high-level and low-level language in size;

2. Executable—can be directly executed by a compatible script engine;

3. Expandable—can be expanded to the low-level language (native script); and

4. Deterministic—the same meta script will always expand to the same native script.

Moreover, when given the same input and executed directly, the meta script will produce the same output as the output produced by executing the native script expanded from the meta script.

Developers can write scripts in a user-facing language, which is then compiled to the intermediate-level language script (meta script). Transactions may be transmitted and stored in their meta script versions. Transaction are validated (i.e. execution of unlocking script and locking script) either in meta scripts or in native scripts, or in a hybrid manner. That is, a meta script engine of a blockchain node 104 can interact with the native script engine to gain more functionalities and efficiencies.

The user-facing language script may be converted directly to low-level language scripts (native scripts). However, by introducing the intermediate-level language scripts (meta scripts), we reduce as much work in converting the user-facing language scripts to native scripts as possible for blockchain nodes 104. This allows nodes 104 to focus their resources in other more important activities such as producing blocks (mining). Examples illustrating how user-facing language script, intermediate-level language script, and low-level language script differ from each other, and improve blockchain scripts in various aspects.

The following provides specific examples of some embodiments of the present invention. These examples refer to the Bitcoin blockchain, but note that the examples apply generally to other blockchains.

Note also that the following examples describe an architecture having three language levels: user-facing, intermediate, and low. In these examples, a smart contract is written in the user-facing language, which is converted in a meta script written in the intermediate-level language, which in turn is converted into Bitcoin opcodes (i.e. low-level language).

Creating a Transaction

Alice can use a user-facing level scripting language to create a locking script [High-Level script B].

The locking script is then compiled to a meta script of the intermediate language and embedded in the transaction.

| TxID₁ | | | |
|---|---|---|---|
| Version | 1 | Locktime | 0 |
| In-count | 1 | Out-count | 1 |

| Input list | | | Output list | |
|---|---|---|---|---|
| Outpoint | Unlocking script | Sequence Number | Value | Locking script |
| Alice's outpoint | $<Sig_A>$ $<PK_A>$ | 0xFFFFFFFF | x satoshi | [Meta Script B] |

There are a few remarks here.

1. The locking script [High-Level script B] is a compact script that is written in the user-facing scripting language. We refer to it as a user-facing locking script.

2. The user-facing locking script is compiled to a meta script.

3. For each meta script, there is a native locking script that comprises native Bitcoin opcodes and is equivalent to the meta script. That is, given the same unlocking script when executed, they always produce the same outcome. This deterministic behaviour and their equivalence may be achieved through testing and verifiable computation.

4. A native locking script can be of several megabytes, or even larger, while its compact form can be as small as several bytes. The significant difference in size is beneficial for Bitcoin nodes when propagating and storing transactions.

5. The unsigned transaction is constructed first (Table 1). When signing the transaction, the compact locking script is expanded to the low-level language locking script (Table 2).

TABLE 1

| unsigned transaction in meta script | | | |
|---|---|---|---|
| Version | 1 | Locktime | 0 |
| In-count | 1 | Out-count | 1 |

| Input list | | | Output list | |
|---|---|---|---|---|
| Outpoint | Unlocking script | Sequence Number | Value | Locking script |
| Alice's outpoint | | 0xFFFFFFFF | x satoshi | [Meta Script B] |

TABLE 2

| unsigned expanded transaction | | | |
|---|---|---|---|
| Version | 1 | Locktime | 0 |
| In-count | 1 | Out-count | 1 |

| Input list | | | Output list | |
|---|---|---|---|---|
| Outpoint | Unlocking script | Sequence Number | Value | Locking script |
| Alice's outpoint | | 0xFFFFFFFF | x satoshi | [Bitcoin opcodes expanded from Meta Script B] |

TABLE 3

| signed expanded transaction | | | |
|---|---|---|---|
| Version | 1 | Locktime | 0 |
| In-count | 1 | Out-count | 1 |

| Input list | | | Output list | |
|---|---|---|---|---|
| Outpoint | Unlocking script | Sequence Number | Value | Locking script |
| Alice's outpoint | $<Sig_A>$ $<PK_A>$ | 0xFFFFFFFF | x satoshi | [Bitcoin opcodes expanded from Meta Script B] |

6. After signing the transaction, while the native locking script is still present in the transaction, the transaction is serialised and double hashed to obtain its transaction ID. That is, TxID₁ is computed based on the expanded locking script instead of the compact locking script. This achieves forkless-ness, i.e. prevents forks in the blockchain, since TxID is defined to be based on the native bitcoin script.

TABLE 4

| signed expanded transaction, with transaction ID computed TxID$_1$ | | | | |
|---|---|---|---|---|
| Version | 1 | | Locktime | 0 |
| In-count | 1 | | Out-count | 1 |

| | Input list | | | |
|---|---|---|---|---|
| | Unlocking | Sequence | | Output list |
| Outpoint | script | Number | Value | Locking script |
| Alice's outpoint | <Sig$_A$> <PK$_A$> | 0xFFFFFFFF | x satoshi | [Bitcoin opcodes expanded from Meta Script B] |

7. For the ease of integrity verification in some scenarios, a secondary transaction ID for the compact locking scripts can be embedded in the transaction before it is signed. E.g., TxID$_1$-secondary can be defined to be a hash value whose preimage comprises one of:

a. version and locktime, b. inputs without unlocking scripts, and c. outputs with locking scripts in its compact forms. This is shown in Tables 5 to 8.

TABLE 5

| secondary transaction ID is embedded when creating an unsigned compact transaction | | | | |
|---|---|---|---|---|
| Version | 1 | | Locktime | 0 |
| In-count | 1 | | Out-count | 1 |

| | Input list | | | |
|---|---|---|---|---|
| | Unlocking | Sequence | | Output list |
| Outpoint | script | Number | Value | Locking script |
| Alice's outpoint | | 0xFFFFFFFF | x satoshi | [Meta Script B] |
| | | | 0 | OP_FALSE OP_RETURN <TxID$_{1\text{-}secondary}$> |

TABLE 6

| the signature is on the expanded transaction and the secondary transaction ID | | | | |
|---|---|---|---|---|
| Version | 1 | | Locktime | 0 |
| In-count | 1 | | Out-count | 1 |

| | Input list | | | |
|---|---|---|---|---|
| | Unlocking | Sequence | | Output list |
| Outpoint | script | Number | Value | Locking script |
| Alice's outpoint | <Sig$_A$> <PK$_A$> | 0xFFFFFFFF | x satoshi | [Bitcoin opcodes expanded from Meta Script B] |
| | | | 0 | OP_FALSE OP_RETURN <TxID$_{1\text{-}secondary}$> |

TABLE 7 the native transaction ID is computed on the expanded transaction including the secondary transaction ID TxID$_1$

| Version | 1 | | Locktime | 0 |
|---|---|---|---|---|
| In-count | 1 | | Out-count | 1 |

| | Input list | | | Output list | |
|---|---|---|---|---|---|
| Outpoint | Unlocking script | Sequence Number | Value | Locking script | |
| Alice's outpoint | <Sig$_A$> <PK$_A$> | 0xFFFFFFFF | x satoshi | [Bitcoin opcodes expanded from Meta Script B] | |
| | | | 0 | OP_FALSE OP_RETURN <TxID$_{1-secondary}$> | |

TABLE 8 replacing the expanded script with the compact script TxID$_1$

| Version | 1 | | Locktime | 0 |
|---|---|---|---|---|
| In-count | 1 | | Out-count | 1 |

| | Input list | | | Output list | |
|---|---|---|---|---|---|
| Outpoint | Unlocking script | Sequence Number | Value | Locking script | |
| Alice's outpoint | <Sig$_A$> <PK$_A$> | 0xFFFFFFFF | x satoshi | [Meta Script B] | |
| | | | 0 | OP_FALSE OP_RETURN <TxID$_{1-secondary}$> | |

Propagating a Transaction

The transaction created by Alice 103a above will be propagated in its compact form (meta script) to save bandwidth. As mentioned earlier, compared to an expanded locking script, its compact form can be several magnitudes smaller. This is particularly relevant for the Bitcoin SV ecosystem where the size of scripts is unlimited, and each block may contain billions of transactions (roughly every 10 minutes).

For now, we assume that there are two types of nodes 104, HL-enabled Bitcoin nodes that are configured to execute the HL scripting language and HL-disabled Bitcoin nodes that are not. Note that a HL-disabled node is an existing node that is oblivious to the HL scripting language and not configured to use the HL language, as opposed to a node that is aware of the HL language and has merely chosen to disable the feature.

Depending on the signature flag used to sign the input of a transaction (see discussion above), a HL-disabled node may deem a transaction containing a CLS invalid. That is, when HL-disabled nodes receive the transaction, they will deem it as invalid and discard it as they have no mechanism to retrieve the original transaction with its expanded locking scripts. The transaction is deemed invalid because during signature validation of the unlocking script of the spending transaction, the signed message is supposed to include the ELS (which the HL-disabled node cannot reproduce from the CLS). This is the same scenario where they receive a transaction ID but do not receive the transaction data. However, the lack of acceptance from these nodes can be addressed when a block if found by a HL-enabled Bitcoin node. HL-disabled nodes receive a block containing Alice's transaction. Her transaction is considered non-existent because the HL-disabled node does not store them. The HL-disabled node may then ask a HL-enabled node for the transaction. The HL-enabled node sends the full transaction without the compact locking script. The HL-disabled node can then validate the full transaction. However, if the majority of nodes are HL-enabled, the HL-enabled nodes can choose to ignore such requests since Alice's transaction will be accepted by the majority of the network 106.

In some examples, if the signature does not sign all of the transaction outputs, a HL-disabled node may be able to consider a HL-transaction valid if the output(s) containing a CLS is/are not signed. In that case, the HL-disabled node can actually validate the transaction with its CLS. However, this vulnerability is not specific to the present invention and in general, any transaction that does not have a signature with a signature flag that signs all outputs, e.g. SIGHASH_ALL, is vulnerable to having its outputs modified.

When a HL-enabled node receives the transaction, it will do the following:

1. Use a library register or a reference table to convert the meta locking scripts to the corresponding native locking scripts to obtain:

| TxID$_1$ | | | | |
|---|---|---|---|---|
| Version | 1 | | Locktime | 0 |
| In-count | 1 | | Out-count | 1 |

| | Input list | | | | |
|---|---|---|---|---|---|
| | Unlocking | Sequence | | Output list | |
| Outpoint | script | Number | Value | Locking script | |
| Alice's outpoint | \<Sig$_A$\> \<PK$_A$\> | 0xFFFFFFFF | x satoshi | [Bitcoin opcodes expanded from Meta Script B] | |

2. Hash the transaction data to obtain its transaction ID and check if it is the same as TxID$_1$.
3. If it is the same, proceed to signature verification or script validation in general.
4. If the transaction is valid, the HL-enabled nodes will propagate the transaction in its compact form to their peers.

When an HL-disabled node verifies a block found by an HL-enabled Bitcoin node, they will request for the full transaction data for the transactions with compact locking scripts, or simply missing transactions from their viewpoint. In this case, the HL-enabled node will send those transactions with expanded locking script. This will allow HL-disabled nodes to verify those transactions. Since each compact locking script is equivalent to the expanded locking script, a transaction validated successfully by a HL-enabled node will be valid to an HL-disabled node too.

Validating a Transaction

Suppose a user, say Bob 103*b*, is going to spend the transaction created by Alice 103*a*. He creates a spending transaction:

| TxID$_2$ | | | | |
|---|---|---|---|---|
| Version | 1 | | Locktime | 0 |
| In-count | 1 | | Out-count | 1 |

| | Input list | | | | |
|---|---|---|---|---|---|
| | Unlocking | Sequence | | Output list | |
| Outpoint | script | Number | Value | Locking script | |
| TxID$_1$‖0 | \<input$_B$\> | 0xFFFFFFFF | y satoshi | [Meta Script C] | |

We assume that input$_B$ unlocks [Meta Script B], where input$_B$ may contain a digital signature from Bob Sig$_B$ with respect to the public key PK$_B$.

As an HL-enabled node, they may choose one of the following options to validate the spending transaction, or more precisely, to validate the script "\<input$_B$\>[Meta Script B]":

1. Use SDL to obtain a compiled locking script and use the native script engine to run \<input$_B$\>[Expanded Meta Script B in Bitcoin opcodes]
2. Use SDL to run \<input$_B$\>[Meta Script B] and obtain the same result as in option 1.

Option 2 provides a computational advantage for an HL-enabled node over an HL-disabled one. Consider a scenario in which there are two script engines, SE$_1$ and SE$_2$, where 1. given the same input to the engines, both SE$_1$ and SE$_2$ produces the same result; and
2. SE$_2$ is more efficient than SE$_1$ (takes less time to produce the result when given the same input).

As a node, switching between SE$_1$ and SE$_2$ will have no impact on the blockchain protocol. Given the justification above, an HL-enabled node can switch between the native script engine (as SE$_1$) and the HL engine (as SE$_2$) to optimise their script validation process.

Storing a Transaction

As a HL-enabled node, they can store transactions with their compact locking scripts to save space. Without loss of generality, we assume that the transaction is present as in table 10.

TABLE 10

| storing a compact transaction with a secondary transaction ID TxID$_1$ | | | | |
|---|---|---|---|---|
| Version | 1 | | Locktime | 0 |
| In-count | 1 | | Out-count | 1 |

| | Input list | | | | |
|---|---|---|---|---|---|
| | Unlocking | Sequence | | Output list | |
| Outpoint | script | Number | Value | Locking script | |
| Alice's outpoint | \<Sig$_A$\> \<PK$_A$\> | 0xFFFFFFFF | x satoshi | [Meta Script B] | |
| | | | 0 | OP_FALSE OP_RETURN \<TxID$_{1-secondary}$\> | |

The secondary identifier may instead be appended to the first output, e.g. [smart contract] OP_FALSE OP_RETURN $TxID_{1\text{-}secondary}$>.

Note that, when expanded into native opcodes, the locking script [Bitcoin opcodes expanded from Meta Script B] can be of several megabytes while in its compact form (meta script), the locking script can be as small as a few bytes. The saving in storage space becomes significant when there are billions of such transactions in one block (roughly every 10 minutes).

Moreover, with the inclusion of the secondary transaction ID, whose integrity is protected by the digital signature, one can verify the integrity of the compact locking script without compiling it, assuming the corresponding signer is trusted.

Figure 6:
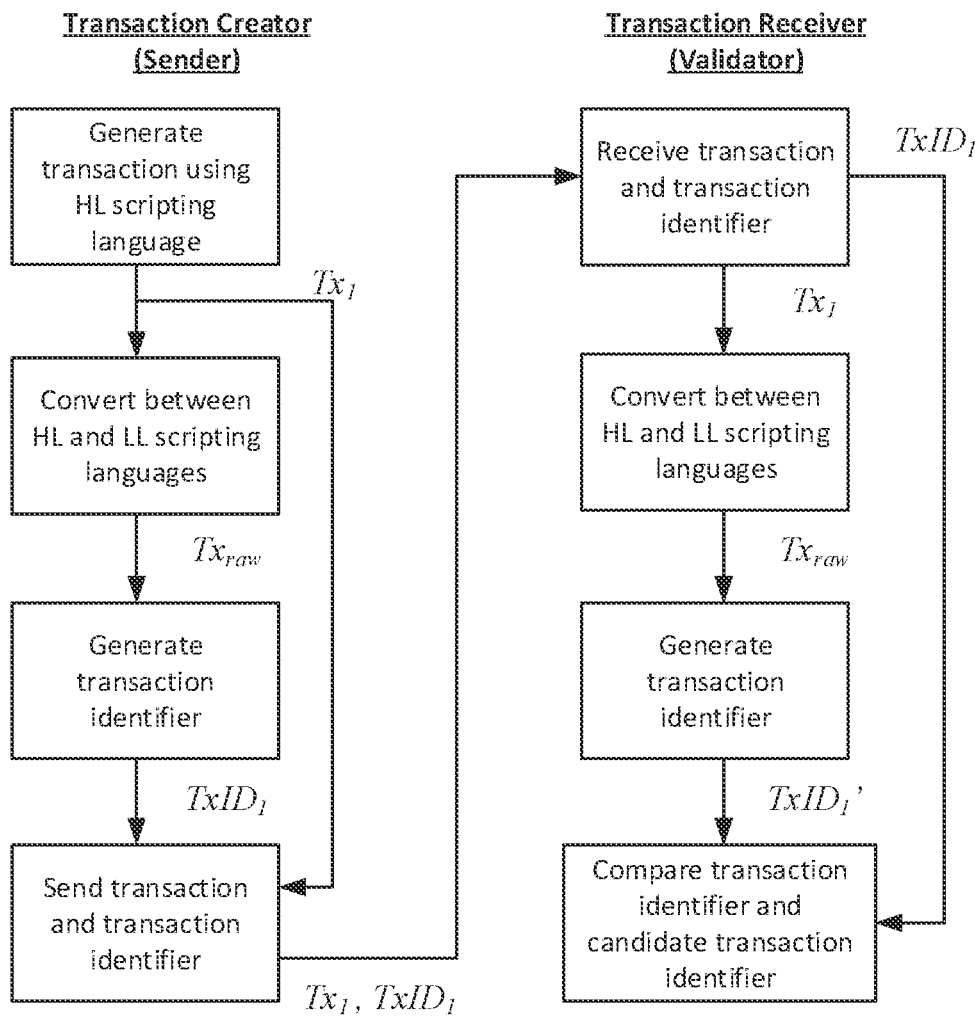
FIG. 6 is a flow chart illustrating an example embodiment of the present invention.

FIG. 6 illustrates the flow of a transaction from generation to validation. First, a transaction $Tx_1$ is generating using the HL scripting language. The HL scripting language is then converted language, generating $Tx_{raw}$. The transaction identifier $TxID_1$ is then generated based on $Tx_{raw}$. The transaction identifier $TxID_1$ and the HL transaction $Tx_1$ are sent to a blockchain node 104. The node 104 receives the transaction identifier $TxID_1$ and the HL transaction $Tx_1$. The HL scripting language is converted into the LL scripting language and the resulting transaction is used to generate a transaction identifier $TxID_1'$. The received and generated transaction identifiers are compared. If they match, the node 104 continues with validating the transaction, and vice versa.

The sending of $TxID_1$ serves as a robust error check mechanism that enables nodes 104 to detect any discrepancies between the mapping (CLS to/from ELS) used by the transaction generator (e.g. Alice 130a) and the transaction validating node 104. However, alternative error checking mechanisms can also be used. The inclusion of $TxID_1$ also allows nodes 104 to quickly start mining operations (e.g. constructing a Merkle tree based on $TxID_1$) while still running the transaction mapping and validation.

FIG. 7 illustrates the flow of a signed transaction from generation to validation. The flow is similar to that of FIG. 6 with the additional step of signing the transaction after conversion of the HL scripting language to the LL scripting language. The transaction identifier is based on the signed transaction. First, the transaction locking script is generated by a transaction engine function and written in the HL language. This outputs the transaction $Tx_{1\text{-}unsigned}$ with compact locking scripts, which is yet to be signed. Normally the unlocking script in the transaction would require signing the transaction. For the transaction to be signed, the HL functions must be replaced with the equivalent set of LL functions. $Tx_{1\text{-}unsigned}$ is passed to a mapping module which replaces the HL functions with native LL functions, e.g. opcodes. The mapping module takes in $Tx_{1\text{-}unsigned}$ and outputs $Tx_{raw\text{-}unsigned}$, which is passed to the signing module. The transaction signing module takes in $Tx_{raw\text{-}unsigned}$ and outputs a signed transaction, $Tx_{raw}$. $Tx_{raw}$ is used to generate the transaction identity TxID. $Tx_{raw}$ is passed again to the mapping module which replaces the LL functions with HL functions. The sender then concatenates TxID and $Tx_1$ and sends them to the blockchain. To check that the mapping used by the receiver is the same as that used by the sender, the receiver maps $Tx_1$ to $Tx_{raw}'$, generates TxID' and checks if it is equal to TxID. If they are the same, then the receiver can proceed with transaction validation. The TxID is used as a parity check in this instantiation.

Figure 8:
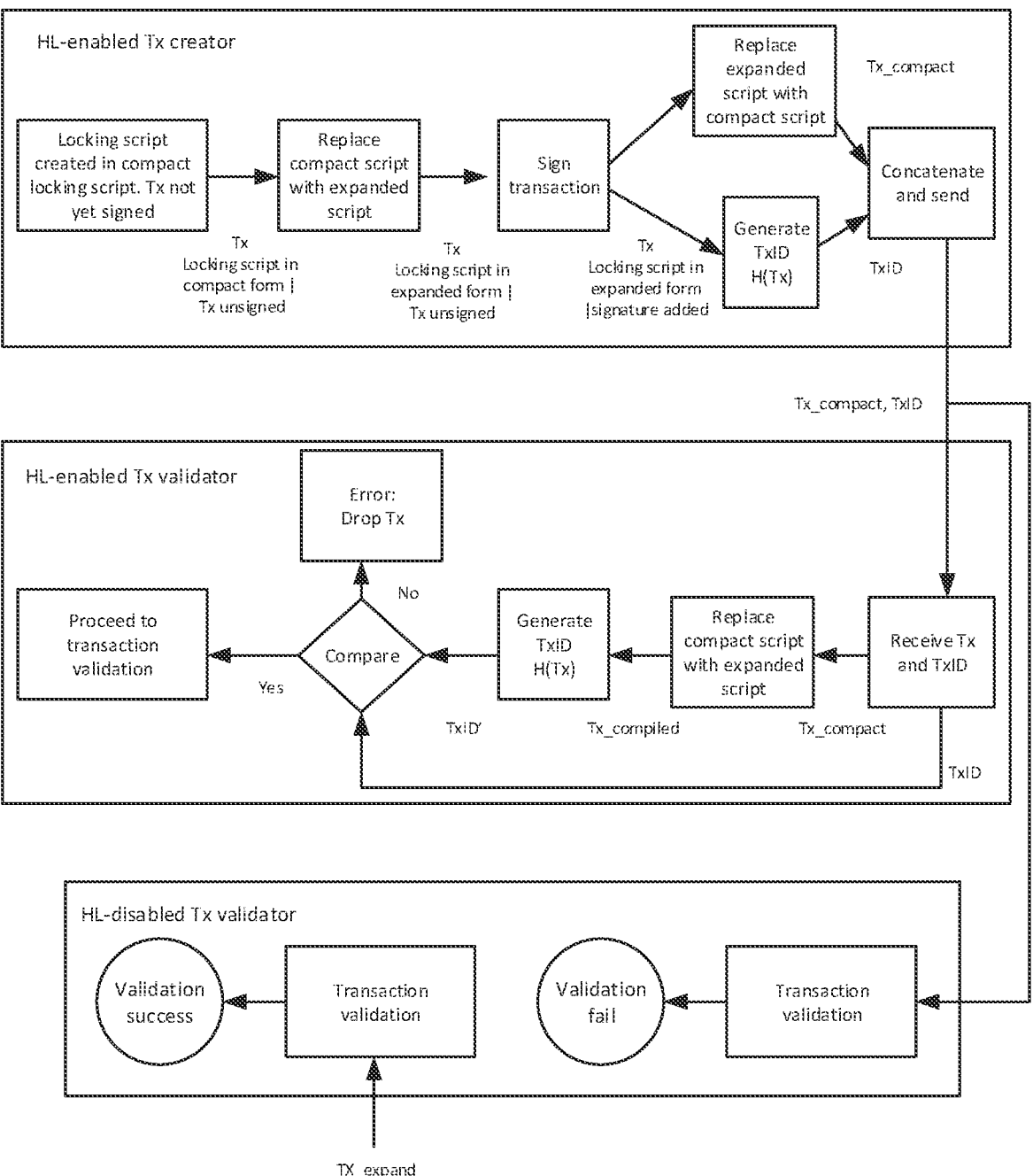

FIG. 8 illustrates the flow of data according to some embodiments. A HL-enabled transaction creator (e.g. Alice 130a) generates a transaction that has a compact locking script. At this point the transaction is not signed. The compact locking script is replaced with the expanded script and then signed. The signed transaction is hashed to generate the transaction identifier. The expanded locking script is replaced with the compact locking script, and both are sent to the blockchain network 106. A HL-enabled transaction validator, (e.g. a node 104) receives the transaction and the transaction identifier. The compact locking script is replaced with the expanded locking script, and then the transaction is hashed to generate a candidate transaction identifier. The candidate transaction identifier is compared with the received transaction identifier, and if they match, the validator proceeds to validate the transaction. If they do not match, the validator discards the transaction. Also shown is a HL-disabled transaction validator. If only the compact version of the transaction is received, the HL-disabled transaction validator cannot validate the transaction. On the other hand, if the expanded transaction is received, the HL-disabled transaction validator can validate the transaction. When the transaction is published on the blockchain, the HL-disabled validator requires the compiled transaction to validate the transaction.

EXAMPLES

This section provides three sets of examples illustrating how the disclosed framework might work. The first set focuses on the practicality and computational efficiency advantages of using a function table when converting from the highest-level (user-facing) language to the intermediate-level (meta script) language. The second set focuses on the compactness of the meta script language. The third set provides an insight on some scripts with more complexity. The third set also illustrates how scripts written in a high-level language can be converted directly to the low-level, native scripting language.

Example Set One

This example illustrates how a script written in a highest-level language can be converted to a compact meta script using a function table. The example script reverses the characters of an input string.

Highest-Level Language

```
word length(value) {value OP_SIZE OP_NIP}
word reverse(value){
    let l = length(value)–1
    value
    loop (l) { OP_1 OP_SPLIT }
    loop (l) { OP_SWAP OP_CAT }
}
reverse('I am fish')
```

The highest-level language is then compiled to the intermediate-level language where a function table and a variable table are either referenced or created. The function table and the variable table are distributed and can be stored locally. In some examples, once created, the variable table is readable and writable, while the function table is readable only As an example, we have the following:

| | | Function table | |
| --- | --- | --- | --- |
| ID | Name | Number of Inputs | Implementation |
| 0 | length | 1 | OP_SIZE OP_NIP |
| 1 | reverse | 1 | $0 0 MOP_FN_CALL<br>1 OP_SUB 0 MOP_SET_VAR<br>0 MOP_GET_VAR MOP_LOOP OP_1 OP_SPLIT<br>MOP_END_BLOCK<br>0 MOP_GET_VAR MOP_LOOP OP_SWAP OP_CAT<br>MOP_END_BLOCK |

| Variable Table | |
| --- | --- |
| ID | Value |
| 0 | |
| 1 | |

There are two functions in this example function table with function ID 0 and 1. The first function computes the size of the input string while the second calls the first and then reverses the string.

A description of function 1 is given below:

There are two functions in this example function table with function ID 0 and 1. The first function computes the size of the input string while the second calls the first and then reverse the string. A description of function 1 is given below:

$0 references the first input to the script, which has not yet been provided. It can be the top item on the stack.

0 MOP_FN_CALL is a syntax that calls a function in the function table with function ID 0.

After executing $0 0 MOP_FN_CALL, the length of the input would be left on the top of the stack.

1 OP_SUB subtracts 1 from the value on the top of the stack and leaves the result on the top of the stack.

0 MOP_SET_VAR would assign the top element on the stack to the variable in the variable table with index 0. This variable will be available for the rest of the execution.

0 MOP_GET_VAR would push the value of the variable with index 0 in the variable table to the top of the stack. This is the syntax to retrieve variables from the variable table.

MOP_LOOP OP_1 OP_SPLIT MOP_END_BLOCK consumes the first value on the stack, and loop the command between MOP_LOOP and MOP_END_BLOCK that many times.

After executing 0 MOP_GET_VAR MOP_LOOP OP_1 OP_SPLIT MOP_END_BLOCK, the string will be separated into one-byte substrings.

Similarly 0 MOP_GET_VAR MOP_LOOP OP_SWAP OP_CAT MOP_END_BLOCK will swap the order of the substrings and concatenate them to form a string that is the reverse of the input string.

Note that the variable table does not have to be filled with values when created. It acts like a place holder for function executions. It allows values to be stored and passed on during an execution.

The same result can be achieved using a "while" loop.

```
word length(value){value OP_SIZE OP_NIP;}
word onesplit( ){OP_1 OP_SPLIT;}
word swcat( ){OP_SWAP OP_CAT;}
word reverse(value){
    value;
    let l = length(value)−1;
    let counter = 0;
    while (l, counter < l) {        //'while' can take two
parameters
        onesplit;                   //max loop number and a
condition
        counter = counter + 1;
    }
    let counter = 0;
    while (counter <l) {            //If max is not set, a
default max
        swcat;                      //can be applied.
        counter = counter + 1;
    }
}
reverse('I am fish')
```

| | | Function table | |
| --- | --- | --- | --- |
| ID | Name | Number of Inputs | Implementation |
| 0 | length | 1 | OP_SIZE OP_NIP |
| 1 | reverse | 1 | $0 0 MOP_FN_CALL<br>1 OP_SUB 0 MOP_SET_VAR<br>MOP_LOOP_IF COUNTER 1 MOP_GET_VAR<br>LESSTHAN MOP_END_BLOCK OP_1 OP_SPLIT<br>MOP_END_BLOCK<br>MOP_LOOP_IF COUNTER 1 MOP_GET_VAR<br>LESSTHAN MOP_END_BLOCK OP_SWAP OP_CAT<br>MOP_END_BLOCK |

-continued

| Variable Table | |
| --- | --- |
| ID | Value |
| 0 | |
| 1 | |

We have two variables here, 1 and COUNTER. We suggest that COUNTER can be a reserved variable that has its default values. That is, we can call COUNTER directly in the meta script.

When it is called in a "while" loop, it starts with value 0, and increments by 1 after each loop.

We now describe how a "while" loop works:

MOP_LOOP_IF COUNTER 0 MOP_GET_VAR LESS-THAN MOP_END_BLOCK starts a loop if the counter is less than the variable with index 0. The counter is a reserved variable that has its default values. That is, we can call COUNTER directly in the meta script. It implicitly counts the loops that have been executed. It starts with 0 and increments by 1 each time. The execution will exit the 'while' loop when counter reaches the maximum either set by the high-level language or the default value, or the condition is not met. The variable with index 0 in this case is the length of the input string. In general, MOP_LOOP_IF can be followed by any condition and the condition is ended by MOP_END_BLOCK.

OP_1 OP_SPLIT is to be repeatedly executed if the condition is met. Note that we did not include it in the function table to show that there is an option here not to include every word defined in the high-level language. A general practice can be that If a function is to be referenced frequently, then it will be included in the function table.

MOP_END_BLOCK marks the end of the code that is to be repeated.

After executing MOP_LOOP_IF COUNTER 1 MOP_GET_VAR LESSTHAN MOP_END_BLOCK OP_1 OP_SPLIT MOP_END_BLOCK, the string will be separated into one-byte substrings.

Similarly MOP_LOOP_IF COUNTER 1 MOP_GET_VAR LESSTHAN MOP_END_BLOCK OP_SWAP OP_CAT MOP_END_BLOCK will swap the other of the substring and concatenate them to form a string that is the reverse of the input string.

Intermediate-Level Language (Meta Script)

Suppose we have input string "I am fish" to the reverse function, the meta script would look like the following:

'I am fish' 1 MOP_FN_CALL

The meta script is then embedded in a transaction (as the locking script). The transaction is transmitted and stored in its meta script form.

The meta script can be directly executed with a meta script engine as described in the function table section. MOP_FN_CALL 1 calls function 1 in the function table. ' I am fish' is the input to the function. The output will be the reverse of the input string.

The meta script can also be expanded to its native form to generate the transaction ID, verify signature, or to be executed with a native script engine, given the function table.

When expanding this example script, we assume that either the input (unlocking script) is known to the creator of the script or some maximum counter for the loop is set by the creator of the script in order to prevent an infinite loop.

Low-Level Language (e.g. Bitcoin Opcodes)

When expanding a meta script, all loops will be unrolled and only native opcodes are allowed. As an example, we have the following native script that corresponds to the previous example meta script.

```
<I am fish> / / The stack starts with a string 'I am fish'
op_1 op_split / /<I>< am fish> --The string is split into two
strings 'I', and ' am fish' with the rightmost ' am fish' on
the top of the stack
op_1 op_split / /<I>< ><am fish>
op_1 op_split / /<I>< ><a><m fish>
op_1 op_split / /<I>< ><a><m>< fish>
op_1 op_split / /<I>< ><a><m>< ><fish>
op_1 op_split / /<I>< ><a><m>< ><f><ish>
op_1 op_split / /<I>< ><a><m>< ><f><i><sh>
op_1 op_split / /<I>< ><a><m>< ><f><i><s><h>
op_swap op_cat / /<I>< ><a><m>< ><f><i><hs>
op_swap op_cat / /<I>< ><a><m>< ><f><hsi>
op_swap op_cat / /<I>< ><a><m>< ><hsif>
op_swap op_cat / /<I>< ><a><m><hsif >
op_swap op_cat / /<I>< ><a><hsif m>
op_swap op_cat / /<I>< ><hsif ma>
op_swap op_cat / /<I><hsif ma >
op_swap op_cat / /<hsif ma I>
```

Note that the size of a canonical script increases linearly with the size of the input string. However, the size of a meta script is almost constant and independent of the size of the input string. This demonstrates the significant saving in storage and bandwidth from the meta script framework.

Example Set Two

Reverse String

The first example in this also reverses the characters in an input string. This example shows how the same function can be achieved without the use of the described function table. In this example, the high-level reverse function is compiled to the meta script. E.g. a compiler is configured to read the function "reverse( )" and compile the corresponding meta script. As a particular example, mapping of the high-level function to the meta script may be stored in memory accessible to the compiler.

High-Level Language (i.e. User-Facing Language):

```
/ /reverse( ) takes a string as an input, and outputs a string
that reverses the characters in the input string.
return reverse("I am fish")
/ /output: "hsif ma I"
```

31 bytes when saved as txt file (source code)

Intermediate-Level Language (Meta Script):

<I am fish> 8 meta_loop one_split 8 meta_loop swap_cat 76 09 4920 61 6d 20 66 6973 68 08 c d1 8 c e2

As an example, we use c0 for meta_loop, d1 for one_split, and e2 for swap_cat.

Note that "7 6 09" is to push 9 bytes of data to the top of the stack.

2 (push data)+9 (data)+6=17 bytes in meta script

When compiling from high-level language, the meta script obtains the number of loops required to reverse the string from the compiler. In this case, number of loops is length of string—1.

Low-Level Language (Bitcoin Opcodes/Native Script):

```
<I am fish>
op_1 op_split / /TOP < am fish> <I>
op_1 op_split / /<am fish> < > <I>
op_1 op_split / /<m fish> <a> < > <I>
op_1 op_split / /< fish> <m> <a> < > <I>
op_1 op_split / /<fish> < > <m> <a> < > <I>
op_1 op_split / /<ish> <f> < > <m> <a> < > <I>
op_1 op_split / /<sh> <i> <f> < > <m> <a> < > <I>
op_1 op_split / /<h> <s> <i> <f> < > <m> <a> < > <I>
op_swap op_cat / /<hs> <i> <f> < > <m> <a> < > <I>
op_swap op_cat / /<hsi> <f> < > <m> <a> < > <I>
op_swap op_cat / /<hsif> < > <m> <a> < > <I>
op_swap op_cat / /<hsif > <m> <a> < > <I>
op_swap op_cat / /<hsif m> <a> < > <I>
op_swap op_cat / /<hsif ma> < > <I>
op_swap op_cat / /<hsif ma > <I>
op_swap op_cat / /<hsif ma I>
```

2 (op_pushdata and data size)+9 (data)+32=43 bytes

When an input to a function is not available at time of compiling, the number of loops may not be available either. In this case, meta script will be designed to take information from the unlocking script or assuming a default maximum value. For example: Locking script (function) in high-level language: reverse ( ) Locking script (function) in meta script: meta_var meta_assignVar meta_var meta_loop one_split meta_var meta_loop swap_cat An unlocking script (input to a function) can be <I am fish>8.

Before converting to Bitcoin opcodes (native script), "8 meta_var meta_assignVar" assigns the value "8" to the variable with name "meta_var". After this assignment, whenever "meta_var" appears, it is replaced by "8". Therefore, as soon as the input is given, we will have the same meta script as we have above. Note that we have only introduced 2 extra bytes for assigning a variable.

Greatest Common Divisor

In this example, the function finds the greatest common devisor (GCD) of two integers.

High-Level language:

```
/ / gcd(a,b) is a function that takes two integers a,b as inputs and
outputs the greatest common devisor of a and b.
return gcd(42,17)
/ / output: 1
```

17 bytes

Intermediate-Level Language:

17 42 meta_SWAPIFGREATERTHAN OP_OVER meta_DUPIF OP_MOD 6 meta_NESTEDDUPIF OP_SWAP OP_OVER OP_MOD meta_ENDNEST-EDDUPIF meta_ENDDUPIF 11 2a f0 78 c7 97 06 fa 7c 78 97 fb f1

13 bytes

Low-Level Language:

```
17
42
OP_2DUP // [17] [42] [17] [42] TOP
OP_GREATERTHAN // [17] [42] [0]
OP_IF
  OP_SWAP
OP_ENDIF
OP_OVER // [17] [42] [17]
OP_DUP // [17] [42] [17] [17]
OP_IF // [17] [42] [17]
  OP_MOD // [17] [8]
  OP_DUP // [17] [8] [8]
  OP_IF // [17] [8]
    OP_SWAP // [8] [17]
    OP_OVER // [8] [17] [8]
    OP_MOD // [8] [1]
    OP_DUP // [8] [1] [1]
    OP_IF // [8] [1]
      OP_SWAP // [1] [8]
      OP_OVER // [1] [8] [1]
      OP_MOD // [1] [0]
      OP_DUP // [1] [0] [0]
      OP_IF // [1] [0]
        OP_SWAP
        OP_OVER
        OP_MOD
        OP_DUP
        OP_IF
          OP_SWAP
          OP_OVER
          OP_MOD
          OP_DUP
          OP_IF
            OP_SWAP
            OP_OVER
            OP_MOD
            OP_DUP
            OP_IF
              OP_SWAP
              OP_OVER
              OP_MOD
            OP_ENDIF
          OP_ENDIF
        OP_ENDIF
      OP_ENDIF
    OP_ENDIF
  OP_ENDIF
OP_ENDIF
OP_DROP // [1]
```

49 bytes

When we have large numbers, the saving becomes much more significant.

Moreover, when we have complicated functions such as elliptic curve point addition and scalar multiplication, the meta script (intermediate-level language) will be at scale of 10 bytes, while the native script (low-level language) will be at scale of megabytes.

Assigning Variables

We briefly described how to assign a meta variable in a meta script. In this section, we introduce a mechanism to assign variables in a native script.

High-Level language:
var=5
return var+var

Intermediate-Level Language:
5 var meta_assign var var op_add

Low-Level Language:
5 OP_TOALTSTACK OP_FROMALTSTACK OP_DUP OP_TOALTSTACK OP_FROMALTSTACK OP_DUP OP_TOALTSTACK OP_ADD When converting to native script (e.g. Bitcoin opcodes), "5 var meta_assign" becomes "5 OP_TOALTSTACK" and assign the value "5" to the variable with name "var". After this assignment, whenever "var" appears, it is converted to "OP_FROMALTSTACK OP_DUP OP_TOALTSTACK". The alt stack becomes a stack for storing all the variables (as an ordered list).

Example Set 3

In the following examples, HL scripts are converted directly to LL scripts, i.e. there are only two levels of scripting languages: high and low.

Greatest Common Divisor (GCD)

The GCD is a function that takes two integers a, b a as inputs and outputs GDC(a, b). This is achieved using the Euclidean algorithm which can be described by the following 1. Let a=x, b=y
2. Given x,y use the division algorithm to write x=yq+r, $0 \leq r < |y|$
3. If r=0, stop and output y; this is the gcd of a, b.
4. If $r \neq 0$, replace (x, y) by (y, r). Go to step 2.

The above algorithm can be easily written and executed using a high level programming language. However to run the Euclidean Algorithm using the bitcoin opcodes script is not an easy task. Since the expanded script does not allow loops, we will have to write down each loop using repeated OP_IF Statements.

The following script takes the two topmost digits x, y in the main stack, where y is the top—and leaves the stack with y, r, where x=yq+r

```
OP_IFDUP OP_IF OP_TUCK OP_MOD
  OP_IFDUP OP_IF OP_TUCK OP_MOD
    OP_IFDUP OP_IF OP_TUCK OP_MOD
    OP_ENDIF
  OP_ENDIF
OP_ENDIF
```

The Algorithm can be written as
OP_IFDUP OP_IF OP_TUCK OP_MOD
  OP_IFDUP OP_IF OP_TUCK OP_MOD
    OP_IFDUP OP_IF OP_TUCK OP_MOD
    OP_ENDIF
  OP_ENDIF
OP_ENDIF The above example will find the GCD of two positive integers if it can be calculated in 3 loops. If the inputs require more loops, we will have to write more if statements. This means if Alice wants to run the algorithm and she does not know the inputs beforehand, she will have to define a maximum number of IF statements that is big enough to accommodate the range of her inputs. What if she wants to set that to 100 or more that will make a very large transaction in compiled script.

In this example, Alice would need to specify the maximum number of iterations, and an SDL enabled node would be able to generate her exact transaction in expanded script.

When the above algorithm is defined as a function/library function/forth word, we describe Stack initial state:<a><b>
Stack final state: <b><r>,
Altstack initial state: Not used
Altstack final state: not used
Calculates: a=qb+r, or r=a mod b
FUNCTION_1—takes <a>, <b>returns <r><q>, where a=b*q+r Stack initial state: <a><b>//<b> is top of the stack
Stack final state: <q>
Altstack initial state: Not used
Altstack final state: <d><b>//<b> is the top of altstack
OP_TUCK OP_2DUP OP_MOD OP_DUP OP_TOALT-
STACK OP_SWAP OP_TOALTSTACK
OP_SUB
OP_SWAP OP_DIV The above can be written in the HL language as a HL function as follows: HL function qr( ) {TUCK 2DUP MOD DUP TAS SWAP TAS—SWAP/}

The HL scripting language allows one to define HL functions. It also allows one to write OP_CODES in a user friendly and efficient manner. For the example above, TUCK DUP SWAP are equivalent to OP_TUCK OP_DUP OP_SWAP, FAS and TAS are equivalent to OP_FROMALT-STACK and OP_TOALTSTACK, +−*/% are equivalent to OP_ADD OP_SUB OP_MUL OP_DIV and OP_MOD and so on.

The HL function qr( ) takes the top two values on the main stack and returns the quotient and remainder, i.e. It takes <a> and <b> and calculates <q> and <r>, where a=b*q+r*/.

FUNCTION_2—one loop to calculate $s_i = s_{i-2} - s_{i-1}g$, and $t_i = t_{i-2} - t_{i-1}g$, parameters of the extended Euclidean algorithm. The example starts the stack with the initial values of $s_{i-2}, t_{i-2}, s_{i-1}, t_{i-1}, q_i$. The algorithm starts at i=2, where $s_0 = 1$, $t_0 = 0$, $s_1 = 0$, $t_1 = 1$ Stack initial state: $<s_{i-2}><t_{i-2}><s_{i-1}><t_{i-1}><q>//<q>$ is top of the stack
Stack final state: $<s_{i-1}><t_{i-1}><s_i><t_i>$
Altstack initial state: Not used
Altstack final state: not used
OP_DUP 3 OP_PICK OP_MUL 5 OP_ROLL OP_SWAP
OP_SUB OP_SWAP
2 OP_PICK OP_MUL 4 OP_ROLL OP_SWAP OP_SUB The above can be written in the HL language as:
HL function st( ) {DUP 3 PICK*5 ROLL SWAP—SWAP 2 PICK*4 ROLL SWAP-}

The HL function st( ) calculates parameters s and t used in calculating the Extended Euclidean algorithm below.

Extended Euclidean Algorithm

This function takes <a><b>, and calculates $s_n$, $t_n$ gcd(a, b), where gcd(a, b)=$s_n$a+$t_n$b Stack initial state: <a><b>//<b> is top of the stack, a>b, both are +ve integers
Stack final state: $<s_n><t_n>$gcd (a, b)//gcd (a, b) on top of the stack
Altstack initial state: Not used
Altstack final state: . . .

```
<a><b> FUNCTION_1
1 0 0 1 4 OP_ROLL
FUNCTION_2
OP_FROMALTSTACK OP_FROMALTSTACK OP_DUP OP_IF
  FUNCTION_1 FUNCTION_2
  OP_FROMALTSTACK OP_FROMALTSTACK OP_DUP OP_IF
    FUNCTION_1 FUNCTION_2
    OP_FROMALTSTACK OP_FROMALTSTACK OP_DUP OP_IF
      FUNCTION_1 FUNCTION_2
      ....
      ....
      OP_ENDIF
    OP_ENDIF
  OP_ENDIF
OP_DROP OP_NIP OP_NIP
```

The HL function EEA is the extended Euclidean algorithm. It runs the word qr( ) and word st( ) in loops 25 times in this example:

```
HL function qr( ) { TUCK 2DUP MOD DUP TAS SWAP TAS –
SWAP / }
HL function st( ) { DUP 3 PICK * 5 ROLL SWAP – SWAP 2 PICK * 4
ROLL SWAP – }
HL function EEA(a, b) {
    a b qr( ) 1 0 0 1 4 ROLL st( ) FAS FAS
    let I = 25
    loop (I) { DUP IF qr( ) st( ) FAS FAS ENDIF }
    DROP NIP NIP }
EEA (in1 , in2)
```

This is an example of a HI scripting language code. It uses loops to repeat the function a maximum of 25. This can be set to much more by simply changing the variable I. For instance, I may be set a number in the 100s or 1000s as needed. The CLS size would not change, while the corresponding ELS would be Megabytes in size.

CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of generating blockchain transactions, wherein the method is performed by a first party and comprises:

generating a first blockchain transaction, wherein the first blockchain transaction comprises a first compact script (CS), wherein the first CS is at least partly written in a high-level (HI) scripting language and comprises one or more HL functions, wherein when executed, each HL function is configured to perform an operation equivalent to a respective operation performed by one or more low-level (LL) functions of a LL scripting language, wherein the first CS is configured to perform an operation equivalent to a first expanded script (ES) written in the LL scripting language and comprising a plurality of LL functions, and wherein the first CS is smaller in storage size than the first ES; and making the first blockchain transaction available to one or more nodes of a blockchain network and/or a second party.

The LL scripting language is the native blockchain scripting language.

The second party may sign the first transaction before returning the transaction to the first party or sending the first transaction to the blockchain network.

The first CS may be written entirely in the HL scripting language. Alternatively, the first CS may be written partly in the HL scripting language and partly in another scripting language, e.g. the LL scripting language.

One or both of the HL scripting language and the LL scripting language may be stack-based scripting languages.

Statement 2. The method of statement 1, wherein the HL scripting language is an intermediate-level (IL) scripting language between a user-facing (UF) scripting language and the LL scripting language, and wherein the HL functions are IL functions.

In other words, the UF scripting language is a highest-level scripting language. The UF scripting language may be a stack-based scripting language.

Statement 3. The method of statement 2, wherein generating the first blockchain transaction comprises:

generating a first UF script (UFS), wherein the first UFS is at least partly written in the UF scripting language and comprises one or more UF functions, and wherein when executed, each UF function is configured to perform an operation equivalent to a respective operation performed by one or more IL functions; and converting the first UFS to the first CS.

The first UFS may be smaller in storage size than the first CS and/or the first ES.

The first UFS may be written entirely in the UF scripting language. Alternatively, the first UFS may be written partly in the UF scripting language and partly in another scripting language, e.g. the IL scripting language and/or the LL scripting language.

Converting the first UFS to the first CS comprises compiling the first UFS to the first CS.

Statement 4. The method of statement 3, wherein a function table comprises a list of function mappings, wherein each function mapping comprises a respective IL function mapped to a set of one or more other IL functions and/or one or more LL functions, and wherein said converting of the first UFS to the first CS is based on the function mappings listed in the function table.

Statement 5. The method of statement 4, wherein the function table comprises one or more function identifiers that each identify a respective IL function, wherein the first CS comprises one or more first data pairs, each first data pair comprises a respective IL function identifier and a call function, and wherein when executed, the call function is configured to execute the set of one or more other IL functions and/or one or more LL functions mapped to the IL function identified by the respective IL function identifier.

Statement 6. The method of statement 5, wherein at least part of the function table is created by the first party, and wherein the method comprises making the at least part of the function table available to one or more nodes of a blockchain network and/or the second party.

Statement 7. The method of statement 4 or any statement dependent thereon, wherein at least part of the function table is created by a party other than the first party, and wherein the method comprises obtaining said at least part of the function table.

Statement 8. The method of statement 7, wherein said at least part of the function table is created by a blockchain node, and wherein said obtaining comprises receiving wherein said at least part of the function table from the blockchain node.

Statement 9. The method of statement 3 or any statement dependent thereon, wherein a variable table comprises one or more variable identifiers and is configured to store a variable in association with each variable identifier, wherein the first CS comprises one or more second data pairs, each second data pair comprises a respective variable identifier and either a read function or a write function, and wherein when executed, the read function is configured to read a variable from the variable table stored in associated with the respective variable identifier, and wherein when executed, the write function is configured to write a variable generated during execution of the first CS to the variable table to be stored in associated with the respective variable identifier.

For instance, the write function may cause a variable that is currently at the top of a stack to be written to the variable table. Similarly, the read function may cause a variable stored in the variable table to be pushed to the top of the stack.

The function table may be created by the first party and made available to one or more nodes of a blockchain network and/or the second party. Alternatively, the variable table may be created by a different party and sent to the first party.

Statement 10. The method of any preceding statement, comprising:

generating a first transaction identifier, wherein the first transaction identifier is generated based on a modified version of the first blockchain transaction, wherein this modified version of the first blockchain transaction comprises the first ES instead of the first CS; and making the transaction identifier available to one or more nodes of the blockchain network.

The first transaction identifier may be generated by first serializing the modified version of the first blockchain transaction, and then computing the hash or double hash of that serialised modified version.

Statement 11. The method of statement 10, wherein said generating of the first transaction identifier comprises:

generating the first blockchain transaction; and replacing the first CS with the first ES in order to generate the modified version of the first blockchain transaction for generating the first transaction identifier.

In other words, the first CS is converted (i.e. expanded) into the first ES.

Statement 12. The method of statement 11, comprising replacing the first ES with the first CS prior to said making of the first blockchain transaction available to the one or more nodes of the blockchain network.

Statement 13. The method of statement 3, wherein said generating of the first blockchain transaction comprises:

generating the modified version of the first blockchain transaction; and generating the first blockchain transaction by replacing the first ES with the first CS.

Statement 14. The method of statement 10 or any statement dependent thereon, wherein the first blockchain transaction is made available to the one or more nodes of the blockchain network together with the first transaction identifier.

For instance, the first blockchain transaction may be concatenated with the first transaction identifier.

Statement 15. The method of any preceding statement, wherein the first blockchain transaction comprises a first input, and wherein the first input comprises a signature generated based on the modified version of the first blockchain transaction.

More specifically, the signature is generated based on the modified version of the first blockchain transaction that comprises the first ES and not the first CS.

Statement 16. The method of any preceding statement, wherein the first blockchain transaction comprises a secondary transaction identifier based on one or more of the following fields:

a version number of the first blockchain transaction.

a locktime of the first blockchain transaction, one or more inputs of the first blockchain transaction, one or more inputs of the first blockchain transaction that do not comprise an unlocking script, and one or more outputs of the first blockchain transaction that comprise a respective CS.

For instance, the secondary identifier may be generated based on a hash (e.g. a double hash) of one or more of those fields.

Statement 17. The method of statement 11 and statement 12, wherein the modified version of the first blockchain transaction on which the signature is based comprises an output comprising the secondary transaction identifier.

Statement 18. The method of any preceding statement, comprising making the first blockchain transaction available to one or more blockchain client applications.

Statement 19. The method of any preceding statement, comprising storing the first blockchain transaction in memory of computing equipment operated by the first party.

Note that the memory may be a hard drive.

Statement 20. The method of any preceding statement, wherein the operation performed by at least one of the HL functions is equivalent to the operations performed by a plurality of the LL functions.

In some embodiments, the respective operation performed by at least some of the HL functions may be equivalent to the operations performed by a respective plurality of the LL functions. In some embodiments, wherein the respective operation performed by each of the HL functions may be equivalent to the operations performed by a respective plurality of the LL functions.

Statement 21. The method of any preceding statement, wherein the first CS is a first compact locking script (CLS), and wherein the first ES is a first expanded locking script (ELS).

Statement 22. The method of statement 2 and statement 21, wherein the first UF script is a first user-facing locking script (UFLS).

Statement 23. The method of any of statements 1 to 20, wherein the first CS is a first compact unlocking script (CLS), and wherein the first ES is a first expanded unlocking script (ELS).

Statement 24. The method of statement 2 and statement 23, wherein the first UF script is a first user-facing unlocking script (UFLS).

Statement 25. A computer-implemented method of validating blockchain transactions, wherein the method is performed by a node of a blockchain network, wherein the node is configured to execute script written in a high-level (HI) scripting language, wherein the blockchain comprises a first blockchain transaction, wherein the first blockchain transaction comprises a first output comprising a first compact locking script (CLS), wherein the first CLS is at least partly written in the HL scripting language and comprises one or more HL functions, wherein when executed, each HL function is configured to perform an operation equivalent to a respective operation performed by one or more low-level (LL) functions of a LL scripting language, wherein the first CLS is configured to perform an operation equivalent to a first expanded locking script (ELS) written in the LL scripting language and comprising a plurality of LL functions, and wherein the first CLS is smaller in storage size than the first ELS, and wherein the method is performed by a blockchain node and comprises:

obtaining a second blockchain transaction, wherein the second blockchain transaction comprises a first input comprising a first unlocking script; and
   validating the second blockchain transaction, wherein said validating of the second blockchain transaction comprises:
      obtaining the first blockchain transaction, and
      a) replacing the first CLS with the first ELS, and then executing the first unlocking script together with the first ELS, wherein a condition of the second transaction being valid is that said execution is successful, or
      b) executing the first unlocking script together with the first CLS, wherein a condition of the second transaction being valid is that said execution is successful.
   Replacing the first CLS with the ES comprises the first CLS being converted (e.g. expanded) into the first ES.

Statement 26. The method of statement 25, comprising:
   on condition that the second blockchain transaction is valid, sending the second blockchain transaction to one or more other nodes of the blockchain network and/or storing the first blockchain transaction in memory of the node.

Statement 27. The method of statement 25 or statement 26, wherein the second blockchain transaction is generated by a second party, and wherein said obtaining of the second blockchain transaction comprises receiving the second blockchain transaction from the second party.

Statement 28. The method of any of statements 24 to 26, comprising obtaining the first blockchain transaction from memory of the node.

Statement 29. The method of any of statements 25 to 28, wherein the second blockchain transaction comprises a second output comprising a second CLS, wherein the second CLS is written in the HL scripting language, wherein the second CLS is configured to perform an operation equivalent to a second ELS written in the LL scripting language, and wherein the second CLS is smaller in storage size than the second ELS, and wherein validating the second blockchain transaction comprises:
   obtaining a second candidate transaction identifier;
   generating a modified version of the second blockchain transaction, wherein in this modified version of the second blockchain transaction, the second output comprises the second ES instead of the second CS;
   generating a second transaction identifier, wherein the second transaction identifier is generated based on the modified version of the second blockchain transaction; and
   comparing the second candidate transaction identifier with the second transaction identifier, wherein a condition of the second blockchain transaction being valid is that the second candidate transaction identifier matches the second transaction identifier.

Statement 30. The method of statement 29, comprising performing said comparison of the second candidate transaction identifier with the second transaction identifier prior to said executing of the first unlocking script together with the first CLS or the first ELS.

Statement 31. The method of any of statements 25 to 30, wherein the HL scripting language is an intermediate-level (IL) scripting language between a user-facing (UF) scripting language and the LL scripting language, wherein the HL functions are IL functions, wherein a function table comprises a list of function mappings, wherein each function mapping comprises a respective IL function mapped to a set of one or more other IL functions and/or one or more LL functions, and wherein:
   a) said replacing of the first CLS with the first ELS is based on the function mappings listed in the function table, or
   b) said executing of the first unlocking script together with the first CLS is based on the function mappings listed in the function table.

Statement 32. The method of statement 25 or any statement dependent thereon, wherein the function table comprises one or more function identifiers that each identify a respective IL function, wherein the first CS comprises one or more first data pairs, each first data pair comprises a respective IL function identifier and a call function, and wherein when executed, the call function is configured to execute the set of one or more other IL functions and/or one or more LL functions mapped to the IL function identified by the respective IL function identifier.

Statement 33. The method of statement 31 or statement 32, wherein at least part of the function table is created by the first party, and wherein the method comprises receiving the at least part of the function table from the first party.

Statement 34. The method of statement 31 or any statement dependent thereon, comprising receiving different parts of the function table from different parties.

Statement 35. The method of any of statements 31 or any statement dependent thereon, comprising creating at least part of the function table.

Statement 36. The method of statement 25 or any statement dependent thereon, wherein a variable table comprises one or more variable identifiers and is configured to store a variable in association with each variable identifier, wherein the first CS comprises one or more second data pairs, each second data pair comprises a respective variable identifier and either a read function or a write function, and wherein when executed, the read function is configured to read a variable from the variable table stored in associated with the respective variable identifier, and wherein executed, the write function is configured to write a variable generated during executed of the first CS to the variable table to be stored in associated with the respective variable identifier.

Statement 37. A computer-implemented method of validating blockchain transactions, wherein the method is performed by a node of a blockchain network, wherein the node is configured to execute script written in a high-level (HI) scripting language, and wherein the method is performed by a blockchain node and comprises:

obtaining a first blockchain transaction, wherein the first blockchain transaction comprises an input referencing an input of a previous blockchain transaction, wherein the first blockchain transaction comprises a first compact script (CS), wherein the first CS is written in the HL scripting language and comprises one or more HL functions, wherein when executed, each HL function is configured to perform an operation equivalent to a respective operation performed by one or more low-level (LL) functions of a LL scripting language, wherein the first CS is configured to perform an operation equivalent to a first expanded script (ES) written in the LL scripting language and comprising a plurality of LL functions, and wherein the first CS is smaller in storage size than the first ES; and as part of validating the second blockchain transaction:
        obtaining a first candidate transaction identifier;
        generating a modified version of the first blockchain transaction, wherein this modified version of the first blockchain transaction comprises the first ES instead of the first CS;
        generating a first transaction identifier, wherein the first transaction identifier is generated based on the modified version of the first blockchain transaction; and
        comparing the first candidate transaction identifier with the first transaction identifier, wherein a condition of the first blockchain transaction being valid is that the first candidate transaction identifier matches the first transaction identifier.

Statement 38. The method of statement 37, comprising:
on condition that the first candidate transaction identifier matches the first transaction identifier, proceeding to validate the first blockchain transaction according to a blockchain protocol operated by the node.

Statement 39. The method of statement 38, comprising:
on condition that the first blockchain transaction is valid according to the blockchain protocol, sending the first blockchain transaction to one or more other nodes of the blockchain network and/or storing the first blockchain transaction in memory of the node.

Statement 40. The method of statement 39, comprising:
receiving a request for the first blockchain transaction from one or more nodes of the blockchain network that are not configured to execute script written in the HL scripting language; and
sending the modified version of the first blockchain transaction to those one or more nodes.

Statement 41. The method of any of statements 37 to 40, wherein generating the modified version of the first blockchain transaction comprises replacing the first CS with the first ES.

In other words, the first CS is converted (i.e. expanded) into the first ES.

Statement 42. The method of any of statements 37 to 41, wherein the first blockchain transaction is generated by a first party, and wherein said obtaining of the first blockchain transaction comprises receiving the first blockchain transaction from the first party.

Statement 43. The method of statement 42, wherein said obtaining of the first candidate transaction identifier comprises receiving the first candidate transaction identifier from the first party.

Statement 44. A computer-implemented method of validating blockchain transactions, wherein the method is performed by a node of a blockchain network, wherein the node is configured to execute script written in a high-level (HI) scripting language, wherein the blockchain comprises a first blockchain transaction, wherein the first blockchain transaction comprises a first output, and wherein the method comprises:

obtaining a second blockchain transaction, wherein the second blockchain transaction comprises a first input comprising a first compact unlocking script (CUS), wherein the first CUS is at least partly written in the HL scripting language and comprises one or more HL functions, wherein when executed, each HL function is configured to perform an operation equivalent to a respective operation performed by one or more low-level (LL) functions of a LL scripting language, wherein the first CUS is configured to perform an operation equivalent to a first expanded unlocking script (EUS) written in the LL scripting language and comprising a plurality of LL functions, and wherein the first CUS is smaller in storage size than the first EUS; and validating the second blockchain transaction, wherein said validating of the second blockchain transaction comprises:
        obtaining the first blockchain transaction, and
        a) replacing the first CUS with the first EUS, and then executing the first EUS together with the first output, wherein a condition of the second transaction being valid is that said execution is successful, or
        b) executing the first CUS together with the first output, wherein a condition of the second transaction being valid is that said execution is successful.

Statement 45. The method of statement 44, wherein the HL scripting language is an intermediate-level (IL) scripting language between a user-facing (UF) scripting language and the LL scripting language, wherein the HL functions are IL functions, wherein a function table comprises a list of function mappings, wherein each function mapping comprises a respective IL function mapped to a set of one or more other IL functions and/or one or more LL functions, and wherein:
        a) said replacing of the first CUS with the first EUS is based on the function mappings listed in the function table, or
        b) said executing of the first CUS together with the first output is based on the function mappings listed in the function table.

The function table may comprise one or more function identifiers that each identify a respective IL function, wherein the first CS comprises one or more first data pairs, each first data pair comprises a respective IL function identifier and a call function, and wherein when executed, the call function is configured to execute the set of one or more other IL functions and/or one or more LL functions mapped to the IL function identified by the respective IL function identifier.

A variable table may comprise one or more variable identifiers and is configured to store a variable in association with each variable identifier, wherein the first CS comprises one or more second data pairs, each second data pair comprises a respective variable identifier and either a read function or a write function, and wherein when executed, the read function is configured to read a variable from the variable table stored in associated with the respective variable identifier, and wherein executed, the write function is configured to write a variable generated during executed of the first CS to the variable table to be stored in associated with the respective variable identifier.

Statement 46. Computer equipment comprising:

memory comprising one or more memory units; and processing apparatus comprising one or more processing units, wherein the memory stores code arranged to run on the processing apparatus, the code being configured so as when on the processing apparatus to perform the method of any of statements 1 to 24.

Statement 47. A computer program embodied on computer-readable storage and configured so as, when run on one or more processors, to perform the method of any of statements 1 to 24.

Statement 48. Computer equipment comprising:

memory comprising one or more memory units; and processing apparatus comprising one or more processing units, wherein the memory stores code arranged to run on the processing apparatus, the code being configured so as when on the processing apparatus to perform the method of any of statements 25 to 45.

Statement 49. A computer program embodied on computer-readable storage and configured so as, when run on one or more processors, to perform the method of any of statements 25 to 45.

According to another aspect disclosed herein, there may be provided a method comprising the actions of the first party and the node.

According to another aspect disclosed herein, there may be provided a system comprising the computer equipment of the first party and the node.

The invention claimed is:

1. A computer-implemented method of validating blockchain transactions, wherein the method is performed by a node of a blockchain network, wherein the node is configured to execute script written in a high-level (HL) scripting language, wherein the blockchain comprises a first blockchain transaction, wherein the first blockchain transaction comprises a first output comprising a first compact locking script (CLS), wherein the first CLS is at least partly written in the HL scripting language and comprises one or more HL functions, wherein when executed, each HL function is configured to perform an operation equivalent to a respective operation performed by one or more low-level (LL) functions of a native, LL scripting language of the blockchain, wherein the first CLS is configured to perform an operation equivalent to a first expanded locking script (ELS) written in the LL scripting language and comprising a plurality of LL functions, and wherein the first CLS is smaller in storage size than the first ELS, and wherein the method is performed by a blockchain node and comprises:

obtaining a second blockchain transaction, wherein the second blockchain transaction comprises a first input comprising a first unlocking script; and validating the second blockchain transaction, wherein said validating of the second blockchain transaction comprises:

obtaining the first blockchain transaction, and a) replacing the first CLS with the first ELS, and then executing the first unlocking script together with the first ELS, wherein a condition of the second transaction being valid is that said execution is successful, or b) executing the first unlocking script together with the first CLS, wherein a condition of the second transaction being valid is that said execution is successful.

2. The method of claim 1, wherein the second blockchain transaction comprises a second output comprising a second CLS, wherein the second CLS is written in the HL scripting language, wherein the second CLS is configured to perform an operation equivalent to a second ELS written in the LL scripting language, and wherein the second CLS is smaller in storage size than the second ELS, and wherein validating the second blockchain transaction comprises:

obtaining a second candidate transaction identifier;

generating a modified version of the second blockchain transaction, wherein in this modified version of the second blockchain transaction, the second output comprises the second ELS instead of the second CLS;

generating a second transaction identifier, wherein the second transaction identifier is generated based on the modified version of the second blockchain transaction; and comparing the second candidate transaction identifier with the second transaction identifier, wherein a condition of the second blockchain transaction being valid is that the second candidate transaction identifier matches the second transaction identifier.

3. The method of claim 2, comprising performing said comparison of the second candidate transaction identifier with the second transaction identifier prior to said executing of the first unlocking script together with the first CLS or the first ELS.

4. The method of claim 1, comprising:

on condition that the second blockchain transaction is valid, sending the second blockchain transaction to one or more other nodes of the blockchain network and/or storing the first blockchain transaction in memory of the node.

5. The method of claim 1, wherein the second blockchain transaction is generated by a second party, and wherein said obtaining of the second blockchain transaction comprises receiving the second blockchain transaction from the second party.

6. The method of claim 1, comprising obtaining the first blockchain transaction from memory of the node.

7. The method of claim 1, wherein the HL scripting language is an intermediate-level (IL) scripting language between a user-facing (UF) scripting language and the LL scripting language, wherein the HL functions are IL functions, wherein a function table comprises a list of function mappings, wherein each function mapping comprises a respective IL function mapped to a set of one or more other IL functions and/or one or more LL functions, and wherein:

a) said replacing of the first CLS with the first ELS is based on the function mappings listed in the function table, or b) said executing of the first unlocking script together with the first CLS is based on the function mappings listed in the function table.

8. The method of claim 7, wherein the function table comprises one or more function identifiers that each identify a respective IL function, wherein the first CLS comprises one or more first data pairs, each first data pair comprises a respective IL function identifier and a call function, and wherein when executed, the call function is configured to execute the set of one or more other IL functions and/or one or more LL functions mapped to the IL function identified by the respective IL function identifier.

9. The method of claim 7, wherein at least part of the function table is created by a first party, and wherein the method comprises receiving the at least part of the function table from the first party.

10. The method of claim 7, comprising receiving different parts of the function table from different parties.

11. The method of claim 7, comprising creating at least part of the function table.

12. The method of claim 1, wherein a variable table comprises one or more variable identifiers and is configured to store a variable in association with each variable identifier, wherein the first CS comprises one or more second data pairs, each second data pair comprises a respective variable identifier and either a read function or a write function, and wherein when executed, the read function is configured to read a variable from the variable table stored in associated with the respective variable identifier, and wherein executed, the write function is configured to write a variable generated during executed of the first CLS to the variable table to be stored in associated with the respective variable identifier.

13. A computer-implemented method of validating blockchain transactions, wherein the method is performed by a node of a blockchain network, wherein the node is configured to execute script written in a high-level (HL) scripting language, wherein the blockchain comprises a first blockchain transaction, wherein the first blockchain transaction comprises a first output, and wherein the method comprises:

obtaining a second blockchain transaction, wherein the second blockchain transaction comprises a first input comprising a first compact unlocking script (CUS), wherein the first CUS is at least partly written in the HL scripting language and comprises one or more HL functions, wherein when executed, each HL function is configured to perform an operation equivalent to a respective operation performed by one or more low-level (LL) functions of a native, LL scripting language of the blockchain, wherein the first CUS is configured to perform an operation equivalent to a first expanded unlocking script (EUS) written in the LL scripting language and comprising a plurality of LL functions, and wherein the first CUS is smaller in storage size than the first EUS; and validating the second blockchain transaction, wherein said validating of the second blockchain transaction comprises:

obtaining the first blockchain transaction, and a) replacing the first CUS with the first EUS, and then executing the first EUS together with the first output, wherein a condition of the second transaction being valid is that said execution is successful, or b) executing the first CUS together with the first output, wherein a condition of the second transaction being valid is that said execution is successful.

14. The method of claim 13, wherein the HL scripting language is an intermediate-level (IL) scripting language between a user-facing (UF) scripting language and the LL scripting language, wherein the HL functions are IL functions, wherein a function table comprises a list of function mappings, wherein each function mapping comprises a respective IL function mapped to a set of one or more other IL functions and/or one or more LL functions, and wherein:

a) said replacing of the first CUS with the first EUS is based on the function mappings listed in the function table, or b) said executing of the first CUS together with the first output is based on the function mappings listed in the function table.

15. A computer program embodied on non-transitory computer-readable storage media and configured so as, when run on one or more processors, the one or more processors perform a method of validating blockchain transactions, wherein the method is performed by a node of a blockchain network, wherein the node is configured to execute script written in a high-level (HL) scripting language, wherein the blockchain comprises a first blockchain transaction, wherein the first blockchain transaction comprises a first output comprising a first compact locking script (CLS), wherein the first CLS is at least partly written in the HL scripting language and comprises one or more HL functions, wherein when executed, each HL function is configured to perform an operation equivalent to a respective operation performed by one or more low-level (LL) functions of a native, LL scripting language of the blockchain, wherein the first CLS is configured to perform an operation equivalent to a first expanded locking script (ELS) written in the LL scripting language and comprising a plurality of LL functions, and wherein the first CLS is smaller in storage size than the first ELS, and wherein the method is performed by a blockchain node and comprises:

obtaining a second blockchain transaction, wherein the second blockchain transaction comprises a first input comprising a first unlocking script; and validating the second blockchain transaction, wherein said validating of the second blockchain transaction comprises:

obtaining the first blockchain transaction, and a) replacing the first CLS with the first ELS, and then executing the first unlocking script together with the first ELS, wherein a condition of the second transaction being valid is that said execution is successful, or b) executing the first unlocking script together with the first CLS, wherein a condition of the second transaction being valid is that said execution is successful.

* * * * *